United States Patent
Wu

(10) Patent No.: US 6,744,874 B2
(45) Date of Patent: Jun. 1, 2004

(54) METHOD OF UNIVERSAL COMMUNICATION AND DEVICES THEREOF

(76) Inventor: Hengning Wu, 11627 N. Shore Dr., Reston, VA (US) 20190

( * ) Notice: Subject to any disclaimer, the term of this patent is extended or adjusted under 35 U.S.C. 154(b) by 211 days.

(21) Appl. No.: 09/681,637

(22) Filed: May 15, 2001

(65) Prior Publication Data

US 2002/0172345 A1 Nov. 21, 2002

(51) Int. Cl.[7] ................................................ H04M 7/00
(52) U.S. Cl. .............................. 379/220.01; 379/91.01; 379/142.05; 379/211.01; 379/211.02; 379/221.13
(58) Field of Search ........................... 379/91.01, 93.01, 379/93.17, 93.23, 142.05, 142.06, 211.01, 211.02, 213.01, 221.13, 220.01

(56) References Cited

U.S. PATENT DOCUMENTS

| | | |
|---|---|---|
| 4,523,087 A | 6/1985 | Benton |
| 4,614,861 A | 9/1986 | Pavlov et al. |
| 5,625,681 A | 4/1997 | Butler, II |
| 5,717,748 A | 2/1998 | Sneed, Jr. et al. |
| 5,717,749 A | 2/1998 | Sneed, Jr. et al. |
| 5,771,283 A | 6/1998 | Chang et al. |
| 5,825,862 A | 10/1998 | Voit et al. |
| 5,852,657 A | 12/1998 | Malik et al. |
| 5,867,570 A | 2/1999 | Bargout et al. |
| 5,870,458 A | 2/1999 | Pappas et al. |
| 5,884,271 A | 3/1999 | Pitroda |
| 5,907,605 A | 5/1999 | Ramirez et al. |
| 5,910,981 A | 6/1999 | Bhagat et al. |
| 5,914,471 A | 6/1999 | Van De Pavert |
| 5,929,771 A | 7/1999 | Gaskill |
| 5,946,386 A * | 8/1999 | Rogers et al. ......... 379/265.09 |
| 5,949,865 A | 9/1999 | Fusinato |
| 5,960,340 A | 9/1999 | Fuentes |
| 5,966,435 A | 10/1999 | Pino |
| 5,970,385 A | 10/1999 | Pykalisto |
| 5,982,870 A | 11/1999 | Pershan et al. |
| 5,995,592 A | 11/1999 | Shirai et al. |
| 6,003,770 A | 12/1999 | Schilling |
| 6,016,476 A | 1/2000 | Maes et al. |
| 6,073,840 A | 6/2000 | Marion |
| 6,178,409 B1 | 1/2001 | Weber et al. |

OTHER PUBLICATIONS

A.M. Noll Introduction to telephones and telephone systems, 3rd ed. Artech House, Boston, 1998.
W. Webb, Understanding Cellular Radio, Artech House, Boston, 1998.

* cited by examiner

Primary Examiner—Bing Bui

(57) ABSTRACT

A method of universal communication, comprising: (1) assigning user phone numbers each representing a user; (2) providing user verification and user digital signature service; (3) providing a handheld personal communication device for user verification and digital signature; (4) dynamic binding of a user phone number to a physical phone number by a database. A universal communication system comprises a handheld personal communication device as the controller for each user, a database system as the intelligent center, and communication adaptors. As a result of the separation of the user phone number from the physical phone number and the related verification and digital signature service, a common interface is provided for various physical communication systems. This allows the various physical communication systems to develop independently and at the same time work together to meet the ever increasing communication demand. This also allows service providers to develop convenient, secure, and cost-effective services. Therefore, a people oriented universal communication system is provided with flexibility, scalability, security, affordability, and efficiency.

20 Claims, 12 Drawing Sheets

Universal Communication System

| | | | |
|---|---|---|---|
| Uphone number: | 7035551234 | PIN: | 1234 |
| Last Name: | Doe | Middle Name: M | First Name: John |
| Address: | 168 Virtual Business Rd. | | |
| City: | New City | | |
| State: | Virginia | ZIP: | 20190 |

Register

Program status: Registration completed successfully.

FIG. 3A

| File type | File name | Size (byte) |
|---|---|---|
| Address | 7035551234.add | 60 |
| PIN | 7035551234.pin | 5 |
| Private key | 7035551234.pri | 335 |
| Public key | 7035551234.pub | 444 |
| Text file | receipt.txt | 261 |
| Signature file | receipt.txt.sig | 46 |

FIG. 3B

Virtual Corporation
518 Business Rd.
New City, Virginia 20190
Uphone (703) 555 5188

Uphone device $21.45
Tax $1.75
-------------------------
Total $23.20

Visa XXXX XXXX XXXX 1234 01/02
Approved 3829343 832492

Date 01/02/01 Time 1:20 PM

FIG. 3C

Uphone user

| Uphone number | Last name | First name | Address |
|---|---|---|---|
| 703 555 1234 | Doe | John | 168 Virtual Business Rd, New city, VA 20190 |
| 703 555 1235 | Doe | Jane | 1234 New Rd, New city, VA 12345 |

FIG. 6A

Message type

| Message type ID | Message type | Remark |
|---|---|---|
| 01 | voice | Default type. |
| 02 | fax | |
| 03 | email | |
| 04 | voicemail | |
| 05 | picture | |
| 06 | music | |
| 07 | video | |

FIG. 6B

Physical number

| Physical number | Message type | Location |
|---|---|---|
| 703 555 4567 | voice | 1234 New Rd, New city, VA 12345 |
| 703 555 4568 | voice | 1236 New Rd, New city, VA 12345 |
| 703 555 4570 | fax | 1234 New Rd, New city, VA 12345 |
| johndoe@a.com | email | 1237 New Rd, New city, VA 12345 (provider) |

FIG. 6C

Binding between Uphone number and physical number

| Uphone number | Message type | Physical number | Status | Notes |
|---|---|---|---|---|
| 703 555 1235 | voice | 703 555 4567 | default | home |
| 703 555 1235 | voice | 703 555 4568 | default-inactive | office |
| 703 555 1235 | fax | 703 555 4570 | default | home fax |
| 703 555 1235 | email | janedoe@a.com | default | |
| 703 555 1235 | voice | 703 555 4569 | current | mobile |
| 703 555 1236 | voice | 703 555 4567 | default | home |
| 703 555 1236 | fax | 703 555 4570 | default | home fax |

FIG. 6D

Incoming call processing list

| Receiver Uphone number | Caller Uphone number | Message type | Socket number |
|---|---|---|---|
| 703 555 1235 | (all) | 01 | 04 |
| 703 555 1235 | (all) | 02 | 05 |
| 703 555 1236 | (all) | 01 | 06 |
| 703 555 1236 | (all) | 02 | 05 |
| (physical call) | (all) | 01 | 04 |
| (physical call) | (all) | 02 | 05 |

FIG. 9A

Outgoing call processing list

| Caller Uphone number | Receiver Uphone number | Message type | Socket number |
|---|---|---|---|
| 703 555 1235 | (all) | 01 | 01 |
| 703 555 1235 | (all) | 02 | 02 |
| 703 555 1236 | (all) | 01 | 01 |
| 703 555 1236 | (all) | 02 | 02 |
| socket 4 | (all) | 01 | 01 |
| socket 5 | (all) | 02 | 02 |

FIG. 9B

Call notification list

| Receiver Uphone number | Caller Uphone number | Message type | Notification type |
|---|---|---|---|
| 703 555 1235 | (all) | 01 | Distinct ring |
| 703 555 1236 | (all) | 01 | Distinct ring |
| 703 555 1236 | (all) | 02 | LED |
| (physical call) | (all) | 01 | Ring |
| (physical call) | (all) | 02 | LED |
| (all) | 703 555 1235 | 01 | Announcement |
| (all) | 703 555 1236 | 01 | Announcement |
| 703 555 1237 | (all) | 01 | Distinct ring |
| (physical call) | 703 555 1235 | 01 | Announcement |
| (physical call) | 703 555 1236 | 01 | Announcement |

FIG. 9C

Eligible voter list

| Uphone number | Name | Social security number |
|---|---|---|
| 703 555 1230 | Johnson M. Doe | 123 45 6789 |
| 703 555 1231 | Susan K. Doe | 123 45 6790 |

Televoting voter list

| Uphone number | Public key | Status |
|---|---|---|
| 703 555 1230 | (file) | voted |
| 703 555 1231 | (file) | to vote |

Televoting result list

| Vote number | Mayor | Senate | Police chief | Status |
|---|---|---|---|---|
| 000 000 001 | 01 | 02 | 00 | signed |
| 000 000 002 | 02 | 04 | 05 | signed |

Televoting signature list

| Vote number | Signature |
|---|---|
| 000 000 001 | (file) |
| 000 000 002 | (file) |

METHOD OF UNIVERSAL COMMUNICATION AND DEVICES THEREOF

BACKGROUND OF THE INVENTION

The present invention relates to a method of communication system and related devices. More specifically, it relates to a method of universal communication and related devices for the exchange of voice, data, and business transactions.

A commonly used communication system is the telephone system. Although the telephone system was initially intended for voice communication, today it is used for communication in a variety of media, such as fax document and digital data. Actually the sending or receiving device is not necessarily a traditional phone, and it can be a fax machine, or a computer, or some other device. The connection can be optical fiber or wireless, instead of the traditional metal wires. Computer controlled Advanced Intelligent Network (AIN) is gradually added to the Public Switched Telephone Network (PSTN). Such functions as caller ID, call waiting, call forwarding, voice mail, auto attendant, and interactive voice response are available.

Cellular phones provide an even more convenient tool for mobile communication. However, there are a few limitations on the use of cellular phones. At certain locations the radio frequency communication may be blocked. At certain environment the radio frequency communication may cause interference to other equipment. The voice quality and reliability still need improvement to reach the level available from a fixed line connection. There are also some health concerns about frequent exposure to radio.

The telephone numbering system currently used is mostly a physical location oriented system. For example, the standard format for telephone numbers in the United States is NPA-XX-)XXXX. The first three digitals specify the area code, the next three digitals the local exchange, and the last four digitals the specific subscriber line in the local exchange. A few exceptions include the N11 format for special services (411 for directory assistance and 911 for emergencies) and the 800 toll-free numbers. The location-oriented numbering system was a natural choice for the automation of the telephone exchange system, but it poses limitations today with the increasing communication demand. For example, when people change their offices, they have to either change their phone numbers or wait for the rearrangement of connections. With the development of more and more communication devices, it is troublesome to keep track of all the phone numbers. Moreover, when we want to call somebody, we need to try these numbers and hopefully one of them will get us to the receiver. There will be also a shortage of available phone numbers. There is a need for a people-oriented communication system.

There are several existing and proposed methods to overcome some of the limitations of the location-oriented system. For example, call forwarding is available to redirect phone calls to a new location. Several schemes are proposed to provide local phone number portability (U.S. Pat. No. 562,568, 5,717,748, 5,717,749, 5,867,570, 5,910,981, 5,949, 865, 5,960,340, and 5,966,435). U.S. Pat. No. 5,982,870 by Pershan et al. proposed a multiple redirection design in an Advanced Intelligent Network platform. Some programs in the telephone industry, such as the "Follow Me" service offered by AT&T (See U.S. Pat. No. 5,960,340 by Fuentes), permit an individual be reached at a single subscriber number for all the telephone calls. All these schemes provide certain people-oriented functions at the receiving side. At the calling side the present communication system is basically location-oriented. The "caller ID" offered by the industry is actually a "caller location ID". For example, when a man calls his wife from his office, the caller ID is the office telephone number with the company name. Later he calls his wife at a public pay phone, the caller ID is the pay phone number with no meaningful name. Then he calls his wife from a bar and the caller ID will be the telephone number of the bar with perhaps the name of the bar owner. In situations where people share a telephone, it is difficult, if not impossible, to tell who is who at both the receiving side and the calling side.

Voice telephone communication is the major contributor to communication traffic due to its characteristic of direct interaction between people. People use telephone to interact with one another. Conversation is one of the basic interactions between people and that is why voice communication constitutes a major part of telecommunication. Another area of people interaction is business transactions. Although the telephone network is used by point-of-sale transaction systems for communication with the central database, the transaction process is carried out mostly by card-form media. A people-oriented communication system will incorporate this important area of communication.

In addition, people's communication needs become more and more versatile with the development of technology. The telephone network is no longer limited to voice communication. It also provides services such as internet, business transactions, and multimedia communication. This will present challenges to the telephone network in all its elements: station apparatus, transmission, switching, and signaling. An effective communication system will depend on the performance of the individual elements and more importantly on how they work together as a system to provide a variety of services to its users.

SUMMARY OF INVENTION

Accordingly, an object of the present invention is to provide a method of universal communication, comprising: (1) Assigning user phone numbers, which represent users and are independent of physical phone numbers; (2) User verification and user signature service; (3) Dynamic binding of a user phone number to a physical phone number by a database.

A user phone number is a phone number representing a particular user, which can be used to uniquely identify an individual or organization. A physical phone number is a phone number corresponding to a particular physical location or physical device. A physical phone number can be used directly by the switch system to connect to a telephone or other communication device. For example, a user phone number is assigned to John Doe, the numbers of his office telephone, home telephone, fax machine, and mobile phone are physical phone numbers. Here the user phone number is preferably in the format of numerical numbers, but it can also be alphabetical text and other characters. The physical phone number is not restricted to telephone communication and it is used to mean other addresses to physical communication devices.

The separation of the user phone number from the physical phone number will provide flexibility and scalability of the telephone network. From a functional point of view, the user phone number is people oriented and the physical phone number is location oriented. One user phone number can be related to a number of physical phone numbers of the particular user. Therefore, the system is ready for the increase in communication devices. The user phone number will be primarily used in people-oriented services, while the physical phone number will be primarily used in the efficient switching of the network. The numbering system for the user phone number adopts the existing format, thus providing back compatibility and a common interface in the telephone network. This allows the independent development in different areas of the network system. Implementation of new technology can be isolated at a chosen level and the modification is transparent to users in both the new system and old system. The combination of the two phone numbers then provides flexibility in the design of systems and services.

The user verification and signature service are two essential aspects of the proposed universal communication system. As a result of separation of the user phone number and the physical phone number, it is necessary to verify the identification of a user for billing and other functions. Digital signature will provide a method of transaction verification. Although virtual phone numbers are used in some prior art phone number portability schemes, it is the user verification and signature service that gives the user phone number the identification feature in a people-oriented universal communication system. Without the user verification and signature service, a virtual phone number, such as subscriber number and directory number, is simply a substitute for the corresponding physical phone number. This may cause problems in certain occasions. For example, an email may be sent out using the email address of another person and this can be frustrating for the receiver and the true owner of the email address.

When a user phone number is assigned, the user verification and signature service are established, but the corresponding physical number or numbers are not necessarily known. The user is given the flexibility to establish such a binding at their discretion. In fact, a user phone number without any associated physical numbers can still perform many communication functions. This is different from the prior art phone number portability schemes where the binding relation is known when the subscriber number is assigned. To use an analog in object-oriented programming languages like lava and C++, the binding according to the present invention is called dynamic binding or late binding. The binding relations are stored at a database system. The database system keeps track of the versatile physical communications associated with the user.

The method according to the present invention enables the user to send and receive information at any place where there is a phone connection, thus providing a universal communication system. In contrast, the prior art methods only provide a call forwarding function at the receiving end.

According to one aspect of the present invention, a phone call includes the following parts: [Receiver phone number]+ [Caller phone number and verification]+[Message type]. The message type is voice by default. It can be fax, text, credit card, music, movie, secured information, etc. The message signal may be transmitted in a different order or format as long as the information can be obtained in the communication system.

In the prior art calling system, the calling party dials the phone number of the receiver and the caller ID is provided by the central office through a digital signal. The proposed calling structure provides more information for the switching system to handle the message efficiently when different media are transmitted in the telephone network. This also gives the user the flexibility to handle different communication media. When the additional information is missing, it is taken as a default telephone calling. This provides back compatibility with the present telephone system and at the same time offers more functionality to areas where the advanced intelligent network is available.

The use of user phone number in the calling structure gives the receiver the true identification of the caller instead of the physical location provided by the caller ID in the prior art system. Therefore, the true caller identification can be provided regardless of the location of the originating call. This will avoid some of the privacy concerns in the use of caller ID. Generally speaking, people would like to identify themselves in a telephone conversation but may have reservation in revealing the physical location in certain circumstances.

It should be noted that in the numbering system of mobile telephone communication an internal number known as International Mobile Subscriber Identity (IMSI) is used, which may corresponds to more than one dialed number such as voice, fax, and data. The dialed number is called Mobile Station Integrated Services Digital Network number (MSISDN). In addition, an International Mobile Equipment Identity number (IMEI) is used to identify the mobile phone. However, the operation is just the opposite of the method used in the present invention. In the prior art, different dialed numbers are converted to an internal number, but in the present invention a single number will be dialed to reach different physical communication devices.

According to another aspect of the invention, the physical numbering system can be in a format for the efficient operation of the switching system for different message type and it is not restricted by the current numbering system. For example, broadband communication and internet data communication may use different addressing systems than the physical number system of voice communication. As the universal communication method according to the present invention provides a common interface for all communication media, independent physical dialing systems can be used in different areas. Therefore, advanced systems can be first adapted in certain areas with great communication demand with full compatibility across the public switched telephone network.

According to still another aspect of the invention, physical dialing is available as an alternative when the purpose is to reach a specific location. The physical dialing number may be of the following format:[physical dialing mode indicator]+primary node number+[node separator]+ secondary node number+[node separator]+third node number+ . . . . The series can continue until the intended location is identified. This is similar to the addressing system in the computer directories and files. Short forms can also be used, such as one leading node separator for the current node and two leading node separator for the immediate upper node. The choice of physical dialing format can be local and message type specific.

According to still another aspect of the invention, a message in message communication mode is provided. During the communication in one type of message, another type of message can be transmitted and displayed properly. For example, during a normal telephone conversation, one can provide her telephone number and address in the text form and the other party can see the information on a display device, thus increasing the efficiency and avoiding possible errors in recording such information. Although simultaneous data and voice communication are possible in Integrated Services Digital Network (ISDN), the difference is that the second message is built upon communication parameters of the first message.

According to still another aspect of the invention, a handheld personal communication device is provided in the universal communication system, comprising: (1) A CPU for processing data and a nonvolatile memory coupled with said CPU for storing data and programs for user phone number verification and signature service; (2) Memory for storage of data; (3) A display device such as a LCD device; (4) A phone device for sending and receiving information, and providing input through the keyboard of the phone device; (5) A short-distance wireless communication device such as an infrared transceiver; (6) Data connection to connect the CPU with the memory, the display device, the phone device, and the short-distance wireless communication device. The short distance in this context is normally within a few meters but may extend to around 100 meters in some situations. This shortdistance communication device is especially useful for communication with electronic devices such as computers and payment systems.

This device acts as the personal controller in the universal communication system. It is the primary link between the user and the database. This device is the controller for the user to update the binding relationship of the user phone number and the physical phone numbers. Since its identification feature can uniquely identify the user, it can serve as a general identification. Moreover, the digital signature feature can be used in business transactions such as reservations, mail orders, on-spot transactions, vending machine payments, and ticket payments. As a universal communication tool, it provides better security, lower cost and more convenience than the card form media such as credit card and debit card. Information stored in the card form media can be stored in this device.

According to still another aspect of the invention, an adaptor is provided at the user end for the control of communication, comprising: (1) A CPU for processing-data and a nonvolatile memory coupled with said CPU for storing data and programs; (2) Memory for storage of data; (3) Circuit to detect control signals; (4) Switches; (5) Means for connecting to communication devices. The adaptor will deliver the incoming communication media to the intended user and physical devices. This will offer more control and flexibility in communication at the user end.

The present invention provides user phone numbers that uniquely identify the users and a universal communication system that accommodates versatile communication needs. It provides a unified communication system with flexibility for the development of the physical switching system, the software system, and user control. For the discussion below, the universal communication system according to the present invention will be termed "Uphone system", the handheld personal communication control device will be termed "Uphone", the user phone number will be termed Uphone number, and the adaptor will be termed "Uphone adaptor".

BRIEF DESCRIPTION OF DRAWINGS

FIGS. 3A to 3C show the registration of a Uphone number.

FIGS. 6A to 6D show the database tables in the database system.

FIGS. 9A to 9E show the operation of a complete adaptor.

The same reference numeral is used to designate the same or similar parts in the drawings.

DETAILED DESCRIPTION

Figure 1:
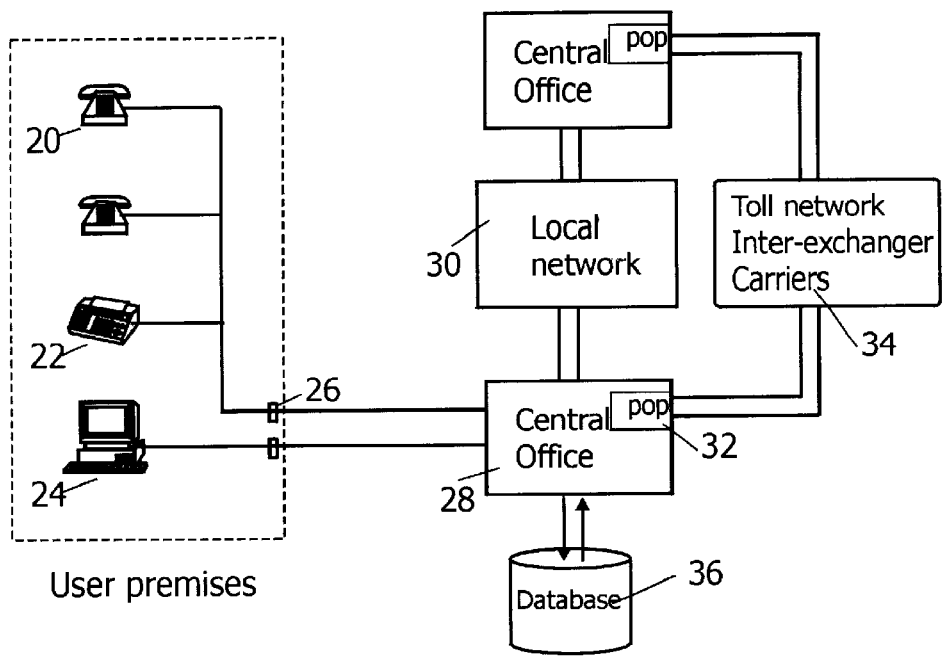
FIG. 1 shows a schematic connection diagram of a typical prior art telephone system.

FIG. 1 shows a schematic connection diagram of a typical prior art telephone system. The user's communication devices such as phone 20, fax machine 22 and computer 24, are connected to the central office 28. The protective device 26 is the connection between the user premises and the outside lines. The central offices are connected by the local telephone network 30 and the toll network 34 through the Point of Presence (POP) 32. The implementation details of the telephone network is not shown since it may be different for different countries. Such details can also be found in the references cited in the specification. General information about telephone communication can be found in Introduction to Telephones and Telephone Systems, 3rd ed. by A.M. Noll, Artech House, Boston 1998, and Understanding Cellular Radio by W. Webb, Artech House, Boston 1998.

The following description is mainly based on the telephone system in the United States when such details are necessary to demonstrate the present invention, but those skilled in the art can readily make the modification without departing the spirit and principles of the invention. For example, the Advanced Intelligent Network consists of Service Switch Points interconnected by trunks for carrying calls, and Signal Transfer Points and Service Control Points connected to each other and the Service Switch Points by data links known as Common Channel Signaling System. A Service Control Point has access to application databases 36 and deliver various call processing functions. A Signal Transfer Point is a signaling hub. A Service Switch Point is a network node normally associated with a central office switch, which is connected by a Signal Transfer Point to a Service Control Point. The is also a database 36 associated with a switch to perform switch-level call processing.

In a typical home, there are several telephones and they are connected in parallel to the same outlet. When a phone call comes in, all the phones will ring. It is desirable to know who is the intended receiver. The prior art solution is to provide additional phone numbers for the same line and present a distinct ring for each phone number. This may be inconvenient on some circumstances. For example, a call at midnight would disturb all the people.

Figure 2:
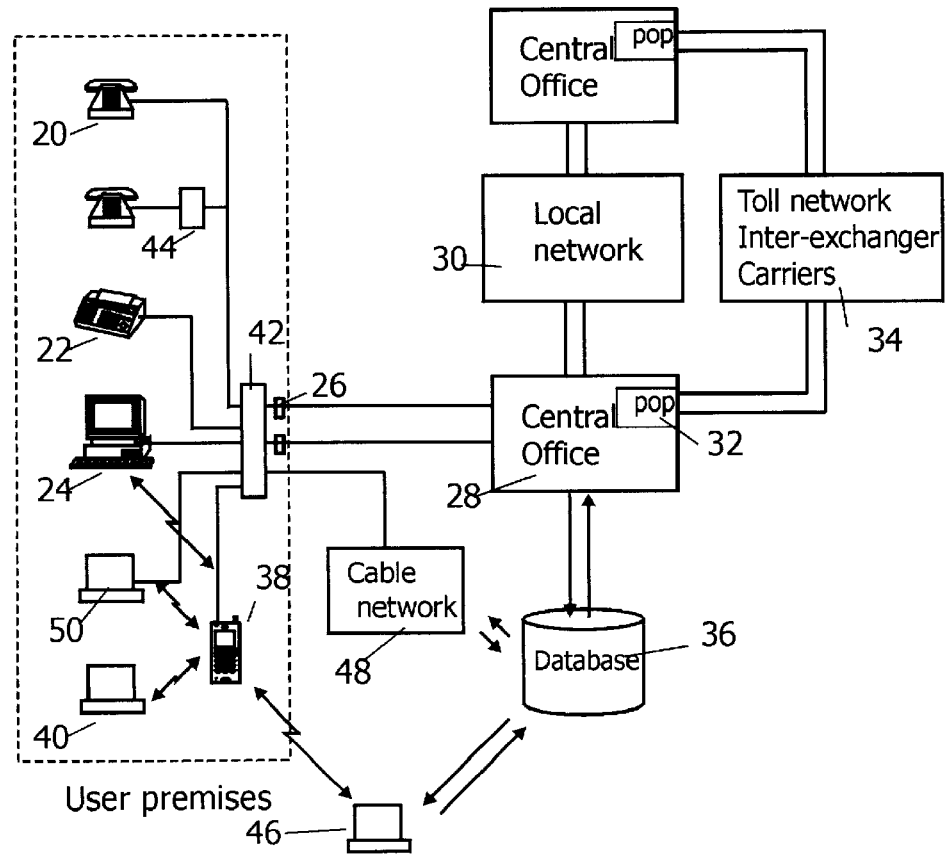
FIG. 2 shows a schematic organization diagram of the universal communication system—Uphone system.

FIG. 2 shows a schematic connection diagram of the Uphone system. A Uphone 38 is used as the controller to update the binding between a Uphone number and physical phone numbers. A database system 36 is used to establish the binding relationship. The database system may be associated with the central office, or the service control point, and may be arranged in a distributed computing system. The database system is preferably implemented in the existing Advanced Intelligent Network, but it can also be implemented through the internet, or it can be simultaneously accessed through the telephone network and the internet. In the Uphone system, the physical phone numbers are related to the physical connection in the telephone system and the Uphone numbers are related to the identification of people and organizations. A Uphone adaptor 42 is added between the communication devices and the central office. Additional adaptor 44 can also be added to an individual device. In addition to the traditional telephone network, other communication networks such as a cable network 48 is also connected through the adaptor 42 to a broadband device 50. The Uphone 38 can also interact with standalone electronic appliances 40 inside the user premises and devices 46 outside the user premises. The Uphone 38 is the controller for the user to interact with all communication devices either through direct connection in the network or through wireless means, and the database 36 is the intelligent center in the system. Therefore, a universal communication system is provided.

When a Uphone number is assigned, the identification verification and digital signature feature is established. The identification verification can be a simple fixed personal identification number (PIN) chosen by the user. Preferably it is a number dynamically generated by an algorithm known to both the database and the user through the Uphone. The algorithm should be of significant complexity so that it is difficult to reverse engineer the algorithm from a limited number of dynamic PINs. The fixed PIN should be transmitted only in a secured communication connection.

One method in the prior art cellular communication uses the database to generate a random number and this number is transmitted to the mobile phone. The algorithm at both the mobile phone and the database takes the random number and the secret number to create the corresponding responses. The responses are then compared, and the identity is positively identified if the responses are the same.

Another way is to take time, the fixed PIN and the Uphone number as input parameters of the algorithm so that every time a unique PIN will be generated. This will save the time for the transmission of the random number. In addition, the receiver number can be added as an additional parameter.

The digital signature feature will be established by the private key and public key generated either at the central database system or at the Uphone. To reduce the cost of the Uphone device, the key pair is preferably generated at the central database system. The private key is kept securely in the Uphone, and the public key kept at the database is available to the public to verify a digital signature. This can be accomplished through a special access number or through a internet site. The public key can be replaced by public key certificate.

The operation of the program is shown in FIG. 3A. Upon input of a unique Uphone number and information about the user, the identification verification program and parameters are chosen, and a pair of private key and public key with the tags "pri" and "pub" are generated. The fixed PIN is saved in a file with a tag "pin" and the user address is saved in a file with a tag "add". These files will be saved in the Uphone database. The files for a user with Uphone number 7035551234 are listed in FIG. 3B along with the program files. A dynamic PIN can be generated by the identification verification program Verification.java. The private key is used to generate a digital signature with a tag "sig" for a particular document and the public key is used to verify the signature. For example, the receipt in FIG. 3C is saved in a file receipt.bct, and the signature file signed by user 7035551234 using the program Sig.java is receipt.txt.sig. The signature can be verified by his public key 7035551234.pub.

The following java programs are used to illustrate the registration of a Uphone number and related identification and signature features. The program Uniphone.java is used to establish a Uphone number and related parameters for user identification verification and digital signature, as shown in FIGS. 3A to 3B. The Address.java program creates objects of the user address. The Keys.java program creates a pair of private key and public key for a user. The Verification.java program creates the dynamic PIN for user verification in a telephone network. The Sig.java program shown is used to generate and verify a digital signature. Although the programs are written in Java here, other programming languages can also be used. For example, a low level language may be used for the programs used in the Uphone.

The dynamic PIN algorithm and digital signature programs are built into the Uphone. The Uphone will also keep a accurate time for the PIN to be valid to a preset time accuracy. Memory is provided for the private key and the public key. The keys are accessible only to the built-in program for security consideration. Memory is also provided for storage of transaction data, which can be displayed, transferred into a computer, or removed. Old data can be periodically transferred into a computer or removed. A log file is provided to keep track of all actions performed by the Uphone. Since transaction data such as receipts are short, the required memory is small. The required memory is only a small fraction of the memory size of a typical PDA device, which help to keep the Uphone device widely affordable. The security functions should be activated through a PIN. When incorrect PINs are provided for a predetermined number of times, say 3 times, the device will be disabled for certain period of time, say 24 hours.

Optionally, encryption programs are provided to encrypt and decrypt digital messages. There are well known secret-key and public key encryption algorithms available. For example, RSA and DH algorithms are available in lava(tm) Cryptography Extension 1.2.1 by Sun Microsystems Inc, Palo Alto, Calif. 94303, USA.

Figures 4A, 4B:
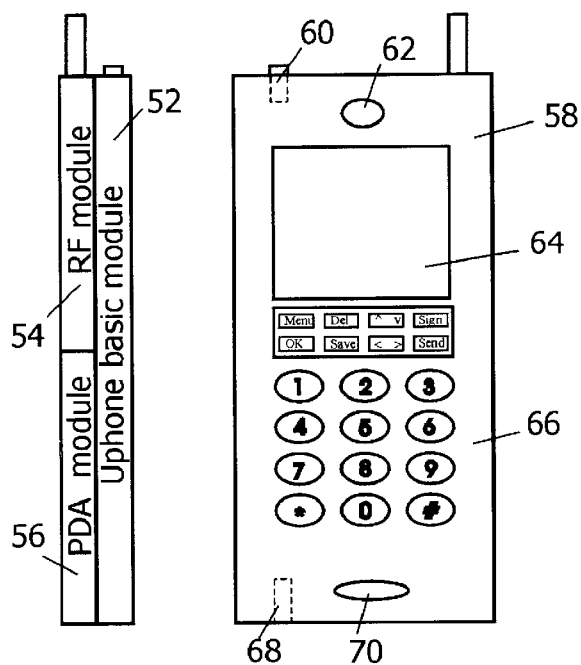
FIGS. 4A and 4B show the communication device—Uphone.

The Uphone basic module 52, encased in a body 58, is provided with a keyboard 66 with a standard dialing pad for touch-tone dialing and some function keys, and a LCD display 64, as shown in FIGS. 4A (side view) and 4B (front view). The LCD display 64 will provide a display of about 10 lines of text and a menu for operation of programs and data. Access to confidential functions and data are restricted by the PIN. Devices and connections for an ordinary phone are included, such as an speaker 62, a telephone jacket 68 and a microphone 70. An infrared transceiver 60 is provided as a short distance communication device. The advantages of an infrared device include low cost and low interference. It can be used when radio signals may be considered hazardous. The infrared transceiver can be used to establish communication with a computer, a payment system, and the telephone system. The infrared communication will use industrial standard protocols such as Infrared Data Association (IrDA) standards and protocols. The infrared device is energy efficient, cost effective, and specially suitable for data communication, as described in U.S. Pat. No. 5,929,771 and 5,995,592. Optionally, a radio frequency (RF) module 54 (either a cellular phone module or a cordless module) and a personal digital assistant (PDA) module 56 can be added to provide more functions (FIG. 4A). A cellular module can provide mobile communication and a cordless module enable the user to move around within a short distance. However, the cost of the basic model should be controlled to provide the widest affordability to everyone with a telephone service.

Figure 5:
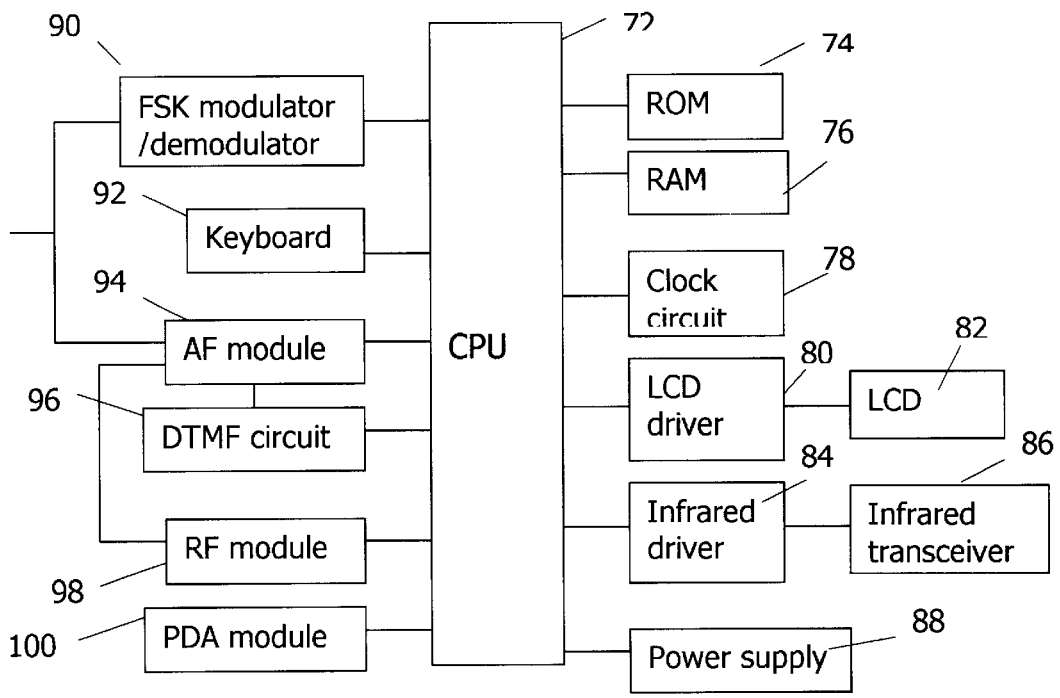
FIG. 5 is a block diagram illustrating the modular structure of the Uphone.

FIG. 5 is a block diagram illustrating the modular structure of the Uphone. The construction incorporates all the functions of a conventional electronic phone and adds the functions of identification and signature, infrared communication and digital signal transmission. The heart of the device is a central processing unit (CPU) 72. The programs and related data such as PIN and private key are stored in read-only memory (ROM) 74 such as a PEPROM. User data are stored in a random access memory (RAM) 76, preferably a non-volatile type. A clock circuit 78 provides the accurate time for the programs. The LCD 82 and associated LCD driver 80 are responsible for the display. The infrared transceiver 86 and related infrared driver 84 are responsible for communication with other infrared devices. A power supply 88 provides the power for the operation of the Uphone. The FSK modulator/demodulator 90 is used to receive and send short digital message. Keyboard 92 provides a means for the input of phone numbers and other function keys. The audio frequency (AF) module 94 includes the devices in a conventional phone and the DTMF circuit 96 is specifically listed for its role as a input means. RF module 98 and PDA module 100 are optional devices for enhanced functionality and separated power supply are provided (not shown).

In a digital phone system, the additional digital information can be provided along with the dialed phone number. In an analog system, the dialing information can be provided by a Dual Tone Multifrequency (DTMF) dialing, or in a digital form by the well-known Frequency-shift Keying (FSK) or Phaseshift Keying (PSK) methods. The text information can be encoded through the ASCII code or more preferably the Unicode Standard which can handle characters in different languages.

The database keeps data tables for the Uphone number, physical phone number, message type, the binding relation between the Uphone number and physical numbers, and service transactions. The database can be organized in the well-known relational database structure. For example, a central database is provided for each area number, and physically the database may reside in one or a collection of connected computers. The central offices can retrieve the binding relation from the database. In the prior art phone number portability schemes, two-tier and three-tier applications are proposed. It seems that the recent development of enterprise javabeans (EJB) technology is a more suitable solution. The EJB architecture is a component architecture for the development of component-based distributed business applications. The EJB server will handle distributed transaction management, security, persistence, remote accessibility, multiclient support, and component location transparency. Therefore, it can be used to develop scalable and reliable client-thin applications. It also facilitates the independent development on the server side and client side. In the present case, the central offices and users are clients to the database. An alternative distributed computing technology is the COM+by Microsoft.

The operation of the database for the binding of a Uphone number to a physical number is illustrated through FIGS. 6A to 6D and FIG. 7. FIG. 6A shows the database table structure of Uphone user, which lists the name and address of each Uphone number. FIG. 6B records the message types in the Uphone system. FIG. 6C lists the properties of all physical numbers. FIG. 6D is the table for the binding relation between the Uphone numbers and all the physical numbers.

Figure 7:
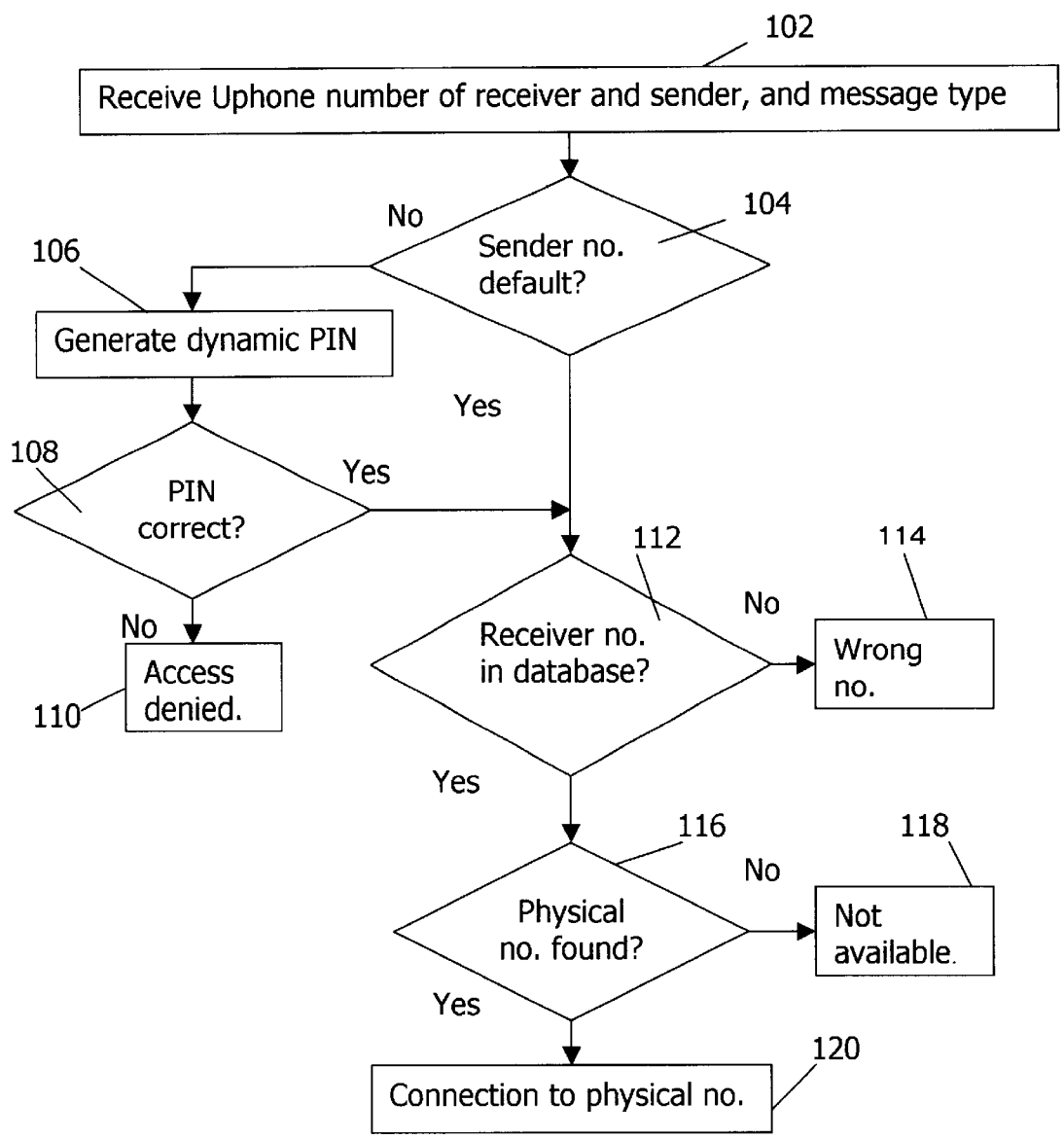
FIG. 7 shows the flow chart for the binding of a Uphone number and a physical number.

The flow chart of FIG. 7 illustrates the basic process for the establishment of the binding relation between a Uphone number and a physical number. First, the database through the central office receives 102 the Uphone numbers of the receiver and sender and the message type. In case the sender Uphone number and message type are missing, they will take the default value from FIG. 6D and FIG. 6B. Then the database will check 104 whether the sender Uphone number is the default for the physical number (the central office knows the physical number of the incoming call). If it is not the default Uphone number, then the identification of the caller must be checked. The database will generate 106 a dynamic PIN, and compare 108 the generated PIN with the PIN supplied by the sender. If the PINs do not match, the identification verification fails and access is denied 110. If the PINs match or the sender number is the default number, the database will check 112 whether the receiver Uphone number is a valid Uphone number against FIG. 6A. If the result is negative, wrong number information will be given 114, If the receiver Uphone number is valid, the database will try to establish 116 the binding relation according to FIG. 6D. The preference for binding is volatile, current, ant then default. If a physical number is obtained, it will be used to make the proper connection 120, otherwise the database will give a negative message 118 to the sender. Specific binding relations can be created in FIG. 6D to meet the needs of a user. FIG. 6D may be supported by additional tables.

To determine whether a service is available for a particular Uphone number, a function is provided at the database for available services such as voice, fax, email, etc. The user has the option to hide certain service from the public. One way to accomplish this is to provide a special access number, preferably a fixed number across the public telephone system. When the phone number is called, the user is prompted to input the Uphone number for service inquiry. Then the available services for the particular Uphone number will be announced to the user through voice or text message.

The user can establish the binding between her Uphone number and physical phone numbers through the Uphone. She can make a request to the database and sign the request. The database can verify the validity by the signature. For each Uphone number, there can be corresponding physical phone numbers for a particular message type. The binding relation between a user phone number and a physical phone number can be current, default, default-inactive, volatile, and expired. The default physical phone numbers normally correspond to physical locations occupied by the user, such as the home phone number and office phone number. The user can specify the active and inactive time period for each default physical number. When a current binding is not available, the default binding will be used. The volatile binding is used for public pay phones and the binding is expired once the connection is disconnected. Since the ID feature will uniquely identify the caller, the caller can be charged in his ordinary phone bill. The expired bindings will be periodically cleared by the database. For example, Jane Doe has a Uphone number 703 555 1234 , and she established default bindings for voice to her office at 703 555 4568 from 9:00 AM to 5:00 PM and to her home at 703 555 4567 from 5:00 PM to 9:00 AM. Today she will continue to work after 5:00 PM, so she makes the office phone number the current binding, and on his way home he can change the current binding to her mobile phone number 703 555 4569.

For a public pay phone, the Uphone can be connected either through the infrared transceiver to an infrared device on the telephone set or through a direct connection by putting the plug into a jack of the telephone device. Since the Uphone can identify itself by its phone number and verification PIN, the user can be properly billed for the service. This is more convenient than the coin operated phone and the card operated phone. As only phone jacks or infrared ports are necessary, the cost for construction and maintenance of a public phone is significantly reduced. Since people no longer share the handset, there is an additional benefit of public health. As a volatile binding can be established and the user can specify the valid period, it is also possible to receive phone calls at a public phone. At places where the use of cellular phones may be restricted or blocked, the phone jack or infrared port can be conveniently located for the use of the Uphone.

The above mentioned portable Uphone is for personal use. For organizations and individual with a large amount of communication traffic, the Uphone can be used together with a desktop computer or a large computer system. The Uphone will keep the confidential information such as private key from possible compromises due to security bleach of the computer. Complicated business transaction systems have been in existence, such as the system described in U.S. Pat. No. 6,178,409 B1 by Weber et al. of VeriFone, Inc.. Complicated business programs can be enhanced with the Uphone system to provide additional customized services.

To provide backward compatibility, the database contains all the phone numbers in the old system in a particular local area as special user phone numbers. There is a one to one relationship between the special user phone numbers and the physical phone numbers. The physical phone number may be different from the old phone number, but the changes are behind the scene and the users will experience no difference. For these numbers, the central office keeps a record of the binding relations and does not need to look up the binding relation at the central database. Eventually these special numbers will be eliminated as people switch to the Uphone system.

The Uphone system can be implemented at the central office level, the area code level, or the national level since the Uphone system can be isolated at a chosen level with full compatibility with the remaining network. For phone calls within the system, the corresponding physical number will be obtained from the database and the information can be used to complete a connection. For phone calls to a Uphone number from outside the Uphone system, the transformation can be performed either at the boundary between the Uphone system or at the originating central office. At the boundary of two systems, the Uphone number is translated into a physical number and the connection will proceed accordingly. When the area code and/or central office code is known to be Uphone number at the originating central office, the central office can queue the related database for the physical number and a flag will be provided to indicate the number has already be translated.

At the receiving end, an adaptor may be provided to take advantage of the signals available: the caller phone number, the receiver phone number and the message type. Therefore, the adaptor comprises: (1) Circuit to detect the control signals; (2) Switches; (3) Means for connecting to communication devices. The adaptor will deliver the incoming communication media to the intended user and physical devices. This will offer more control and flexibility in communication at the user end. On one hand, the adaptor works like a caller ID device in detecting the control signals, and the prior art technologies in caller ID can be incorporated, such as the inventions disclosed in U.S. Pat. No. 5,771,283, 5,825,862, 5,852,657, and 5,907,605. On the other hand, the adaptor functions like a switch to direct communication. One device in the prior art is described in U.S. Pat. No. 5,870,458 by Pappas et al..

The adaptor in its simplest form will add the functions of the Uphone system to existing communication devices. It has a circuit to detect the caller phone number, the receiver phone number, and the message type. The circuit structure is like the circuit used for caller ID in the prior art except additional information is also provided from the central office and captured by the adaptor. The receiver number is kept in the adaptor and the switch will turn on only for the correct receiver phone number. Optionally, more than one receiver numbers can be added to the adaptor and a distinction can be given in a LCD or by distinct rings or by voice announcement of the phone number. For outgoing phone calls, the adaptor will add the appropriate Uphone number. For communication originated from the premises of a Uphone number, the system may choose not to perform the verification or may accept the fixed PIN as the verification. This kind of adaptor can connect directly with a communication device or be built into the communication device.

Figure 8:
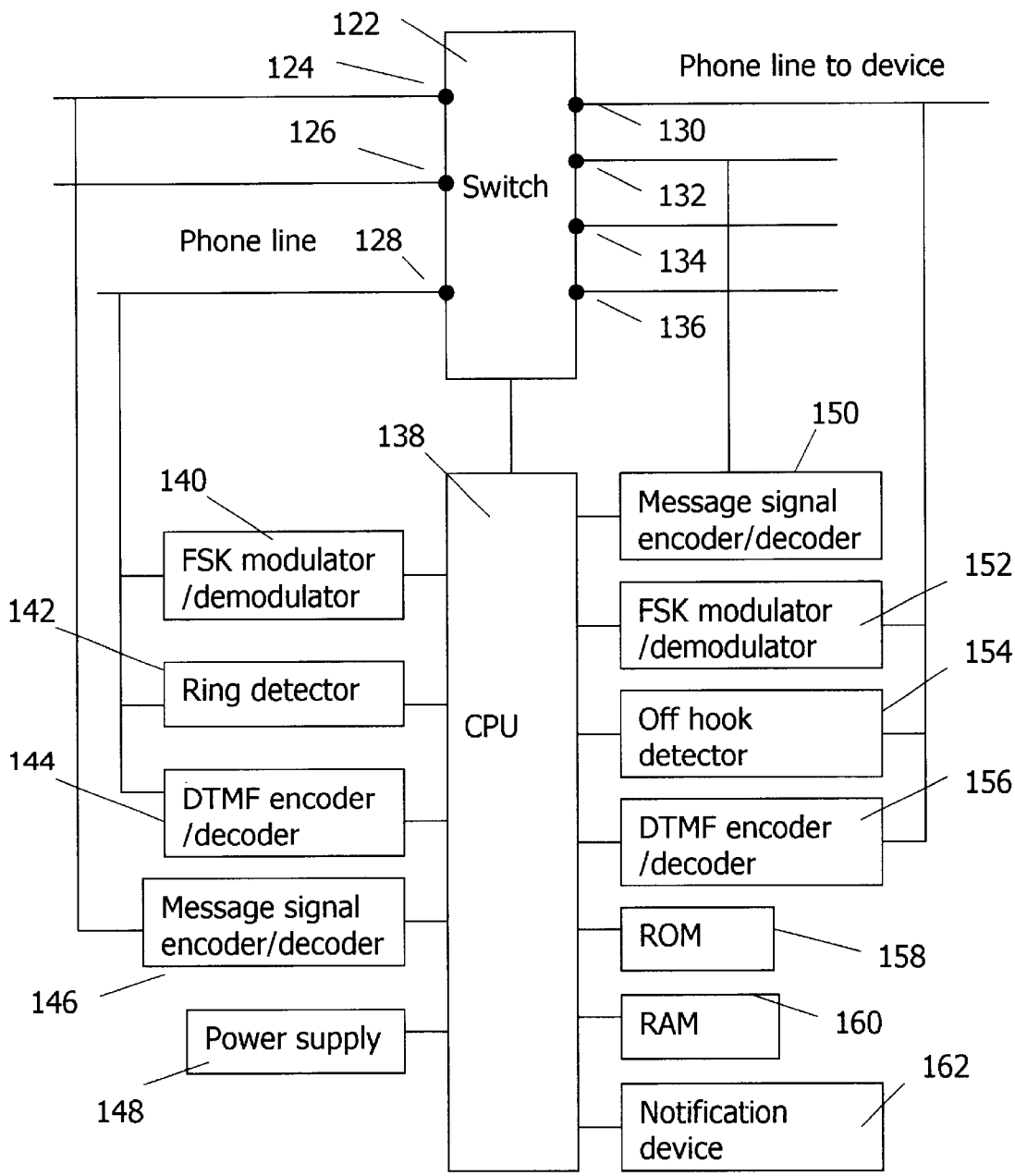
FIG. 8 is a block diagram illustrating the construction of the communication adaptor—Uphone adaptor.

A complete adaptor will make full use of all the control signals available. It is the communication hub at the user's premises. All the communication devices are connected to the adaptor. The adaptor will direct the communication to the intended user and physical devices according to the caller phone number, receiver phone number and message type. A block diagram of the adaptor is shown in FIG. 8. A switch 122 is provided with a number of sockets 124, 126 and 128 for physical connections and a number of sockets 130, 132, 134 and 136 for connection to different communication devices. The sockets are numbered internally for connection identification purpose. The operation of the switch is controlled by a CPU 138 with programs stored in a ROM 158 and data in a RAM 160, preferably a nonvolatile type. FSK demodulator/modulator 140, ring detector 142, and DTMF encoder/decoder 144, are used to detect the message signal from a phone line connected to the socket 128. An appropriate message signal encoder/decoder 146 is provided for each incoming communication line. Similarly, FSK demodulator/modulator 152, off-hook detector 154, and DTMF encoder/decoder 156 are used to detect outgoing message signals from phone line connected to the socket 130. An appropriate message signal encoder/decoder 150 is provided for other lines to sockets 132, 134 and 136. Notification can by provided by a notification device 162 with announcement, or distinct ring, or LED blink, or LCD display, or a combination of the different means. Power supply 148 provides the energy for the adaptor. The adaptor can also provide the physical connection among the communication devices within the user premise. It is to be understood that the logic relation is described in FIG. 8 and the actual physical connections may differ depending on the particular implementation.

Figure 9D:
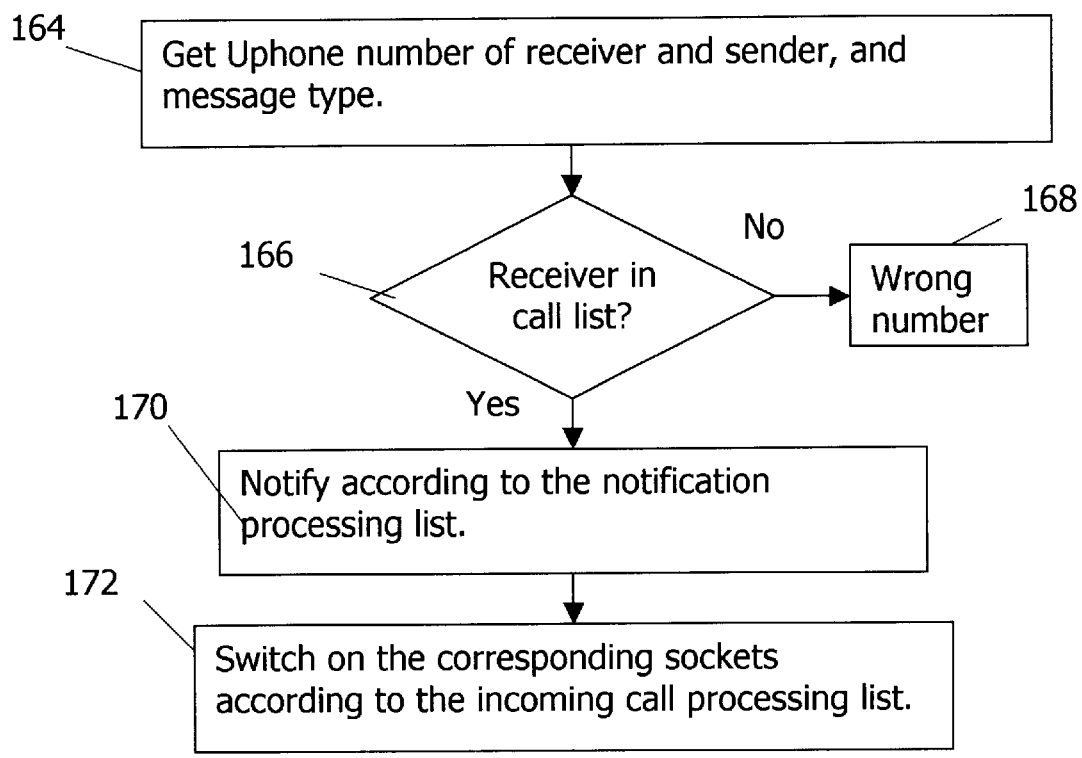
Figure 9E:
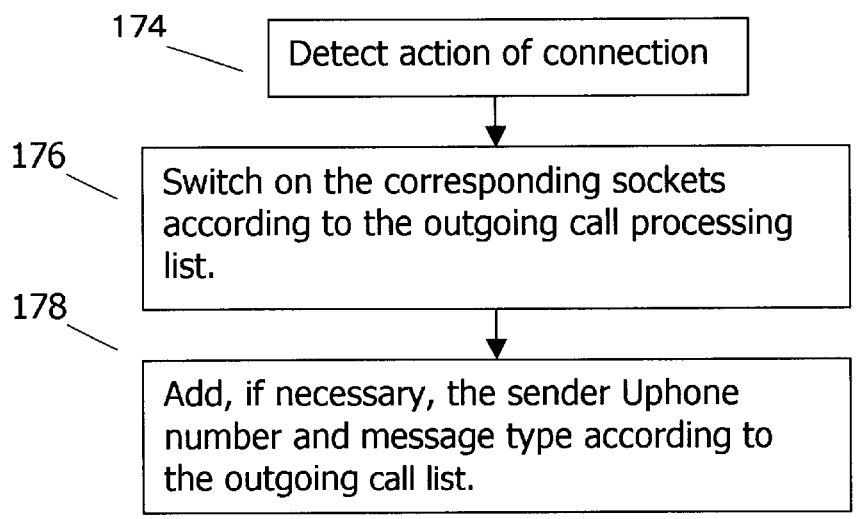

The operation of the adaptor is further explained with reference to FIGS. 9A to 9E. For example, socket numbers 1-3 are connected to outside lines and socket numbers 4-7 are connected to communication devices like phone, fax machine, and computer. FIG. 9A is the incoming call processing list and FIG. 9B is the outgoing call processing list. FIG. 9C is the call notification list, in which any combination of the basic signals can be used to determine a particular notification process. As shown in the flow chart FIG. 9D, for an incoming call the first step is to get 164 the message signal (Uphone number of both the receiver and the sender, and the message type). Then the receiver number is checked 166 against the list in FIG. 9A. If the receiver number is not in the list, a wrong number message is provided 168. If the receiver number is valid, notify 170 the receiver according to the notification processing list (FIG. 9C) and switch on 172 the corresponding sockets according to FIG. 9A, and the proper direction of a incoming call is accomplished. For an outgoing call, the first step is to detect 174 the request for connection (FIG. 9E). According to the message signal received (if any) or the socket number of the initiating line, the proper sockets are switched 176 to connection in reference to FIG. 9B. If necessary, the adaptor will add 178 the sender Uphone number and message type to the message signal. For shared devices, a Uphone can be used to make the call and provide the proper user verification to the system.

The receiver Uphone number, the sender Uphone number, and the message type are the basic message signals. Additional information can also be provided as parameter/value pair after the main message control signals.

A message-in-message communication mode is provided according to this invention. During the communication in one type of message, another type of message can be transmitted and displayed properly. In one embodiment, the second message can be transmitted over the same physical connection. For example, during a normal telephone conversation, one can provide her telephone number and address in the text form and the other party can see the information on a display device, thus increasing the efficiency and avoiding possible errors in recording such information. The text information can be provided in a digital form by the well-known Frequency-shift Keying (FSK) or Phaseshift Keying (PSK) methods. The text can be displayed just like the Caller ID with Name is displayed in the prior art method. In this case, additional line seize is not necessary for the transmission of the text message since the same physical connection can be used for both messages. The display device detects the second message and displays it accordingly. This can occur simultaneously with the voice conversation or the first message can be suspended when the second message is transmitted and the first message type is resumed when the second message type is finished. Examples of this type of message-in-message mode includes short text messages during a telephone conversation. A narrow band message can also be incorporated in a broadband communication.

In cases where a different physical connection is necessary for the transmission of the second message type, the second message can be easily established from the known receiver Uphone number, the caller Uphone number and the message type. The receiver and caller Uphone numbers are from the communication parameters of the first message type since both parameters are known to the caller and receiver. One way is to use the Uphone to send a communication request to the adaptor with the same receiver number but a new message type. The adaptor will then make the proper connection request to the outside line and at the same time switch on the connection to the physical device for the new message type. Another way is to use the Uphone to obtain the communication parameters of the first message (if not a voice communication through the Uphone) and pass the parameters to the new physical device for the second message. For example, during a telephone conversation the two sides decide to exchange some home video, the caller initiates the video player connected to a broadband connection cable and the adaptor sends out the connection request signal and the proper physical connection can be established. The two message types can be terminated separately.

Although data and voice can be transmitted simultaneously over ISDN, the difference is that in the message-in-message mode, the second message is established based on the information of the parties in the first message. In some software like Net Meeting by Microsoft, people can exchange voice, text and even video messages at the same time. Once the two computers are connected, data can be exchanged whether they are voice, text or video. They are all digital messages. However, this approach requires the presence of two computers and the messages are displayed on the computer peripherals only. The message-in-message mode according to the present invention can take all available communication means (digital and analog).

According to still another aspect of the invention, physical dialing is available as an alternative when the purpose is to reach a specific location. For example, the physical dialing number is of the following format:[physical dialing mode indicator]+primary node number+[node separator]+ secondary node number+[node separator]+third node number+ . . . . The series can continue until the intended location is identified. This is similar to the addressing system in the computer directories and files (but not exactly the same). Short forms can also be used, such as one leading node separator for the current node and two leading node separator for the immediate upper node. Physical dialing can be very convenient for certain situations such as telephone calls within a company or a home, community notifications, and line connection test.

For example, the "#" key may be used as the physical dialing mode indicator and the "*" key may be used as a node separator. The most often used nodes may be assigned single digitals. For example, #1*1*1*618 can be a physical dialing sequence. When the caller node is 101*102*103*123, he can use the short form dialing of #*618 to connect to 101*102*103*618 and #**2*321 to connect to 101*102*2*321. The choice of the keys for the physical dialing mode and the node separator can be local specific or message type specific.

The above physical dialing scheme can only be recognized inside the Uphone system. For physical dialing from outside the Uphone system, an access number will be provided. When the access number is dialed, the user will be prompted to input the physical number.

The operation of the Uphone system will be further illustrated by the following examples.

EXAMPLE 1

Relocation

When an individual move to a new location, she can simply update the physical phone number.

She gets the phone service immediately. For the phone company, it is not necessary to change the physical number of a telephone outlet. In the prior art, reconnection in the switching system is necessary which gives rise to the service cost and delay when people move to a new location.

EXAMPLE 2

Mobile Professional

Keeping in touch is very important for mobile professionals. In the Uphone system, he can set up his default setting for his office number, and update his current binding to his cellular phone number, or hotel room phone number. His coworkers and clients can get in touch with him by calling his Uphone number. In addition, company cellular phones can be shared among business travelers whenever somebody needs one without the trouble to memorize the mobile phone number of the traveler.

EXAMPLE 3

Sale Receipt

Business transaction is an important area of human communication. For a point-of-sale (POS) transaction in the prior art, the casher scans the prices of commodity and get the total price plus required taxes. Then the customer is asked to give a credit card, or a debit card, or a check. The casher then performs the necessary verification, and accepts the payment. For credit or debit card payment, the card is scanned by a card reader and the information is verified against the data from a central database. Afterwards, a receipt is printed out and the customer is asked to sign the receipt. However, it is difficult to prevent the use of a stolen credit card. For remote sale, only the credit card information is needed and it is even more prone to credit card fraud. The credit card information may be abused by an unethical store owner or an unethical store employee. The credit card information may also be stolen from stores, personal computers, the internet, and mails. It is also difficult for an ordinary casher to distinguish a forged handwritten signature from a genuine signature. Credit card fraud causes a significant loss to both business and consumers every year.

The Uphone system provides a convenient and secure communication method to business transactions. In the Uphone system, the credit card information is stored in the Uphone. The store is equipped with an infrared transceiver or a direct cable connection to communicate with the Uphone. So the customer simply provides his Uphone number and the credit card or debit card information by a choice in his Uphone. When the receipt is ready, it is transmitted to the Uphone and the customer then digitally signs the receipt and sends the signature to the store casher. The signature is then verified through the public key available from the Uphone system. This verifies both the identification of the customer and the content of the receipt. The customer has the receipt in his Uphone, which can be easily transmitted into a computer for book keeping or simply used to check against a monthly credit card statement. For the store, this provides an efficient way to keep receipts and signatures. The whole transaction process is made more efficient and accurate by the Uphone system.

Figure 10:
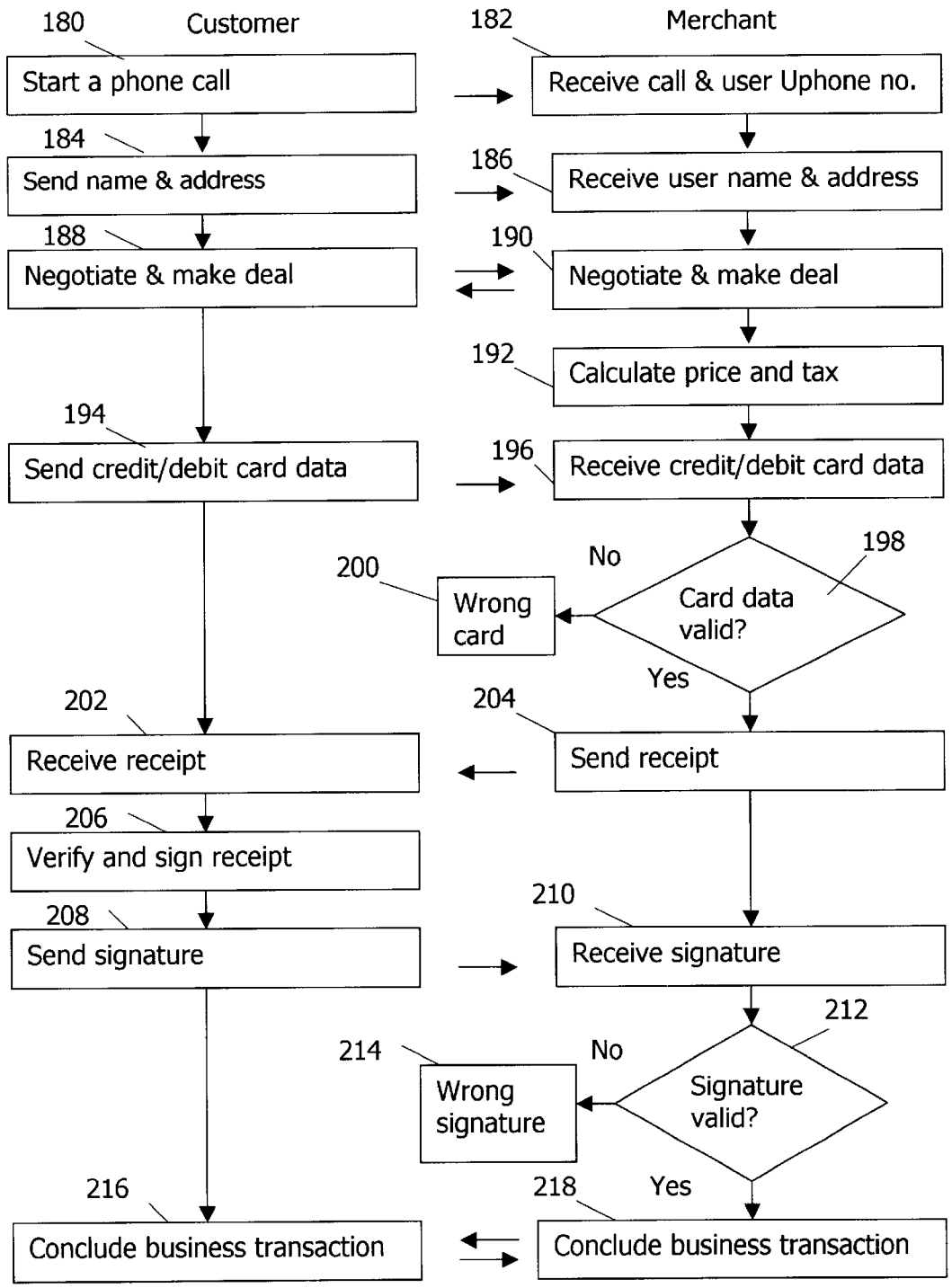
FIG. 10 is a flow chart illustrating the interaction between the customer and merchant in a business transaction in the Uphone system.

For the remote sale process such as order by telephone, the advantage of the Uphone system is even more obvious. The process is illustrated with reference to FIG. 10. First, the customer initiates 180 a phone call to the merchant. The merchant receives 182 the phone call and gets the Uphone number of the customer. The arrow between blocks indicates the direction of information flow between the customer and merchant. With the Uphone number the merchant can get the basic information (address and public key) about the customer from the Uphone database system. Then the customer can provide 184 his name and address in text form through the message-in-message method during the telephone conversation and the merchant will receive 186 the message. This will save the time to input such information from the customer to the salesperson of the merchant by voice and then from the salesperson to a computer by keyboard. More importantly, it can avoid possible errors in the process. Both sides then negotiate and make 188, 190 a business deal.

When the deal is done, the salesperson will calculate 192 the price and the customer can give 194 the credit card information stored in the Uphone memory in digital form. Upon receiving 196 the information, the salesperson can check 198 the validity of the information with an appropriate server. If the information is invalid 200, the customer may be asked to provide another card or the process is terminated. If the information is valid, the salesperson will prepare a receipt and send 204 it to the customer. The customer receives 202 the receipt, verifies the content, and then digitally signs 206 the receipt by the signature function of the Uphone. The customer then sends 208 the signature. After receiving 210 the signature file, the salesperson can verify 212 the signature through the public key related to the Uphone number of the customer. The signature verifies the identification of the customer and the content of the receipt. If the signature is wrong 214, the transaction is not complete and the cause will be investigated. When the signature is verified successfully, the customer and salesperson will inform 216, 218 each other of the completion of the transaction. The principles illustrated in FIG. 10 can also be applied to other applications of business transactions.

The above process can also be implemented through the internet for online shopping. A communication method such as IR communication will enable the Uphone to provide the necessary information to the computer. The Uphone can also be used for several services and purchases before a final payment, effectively performing the functions of the special device disclosed in U.S. Pat. No. 6,073,840 by Marion.

The Uphone provides a convenient, secure, and cost-effective replacement for the card-form media. All the data stored in a card can be stored in the memory of the Uphone. The transaction functions performed by a card, such as those disclosed in U.S. Pat. No. 4,523,087, 4,614,861, 5,884,271, 5,9144,71, and 6,003,770, can be performed by the Uphone. At first glance, it seems that the Uphone will cost more than the card-form media. However, the Uphone provides a common media for all the service providers and therefore saves the cost for the manufacture and delivery of many cards. The card information can be easily updated in the Uphone while replacement of a physical card has a higher cost. The saving from the reduction of fraud is another benefit of the Uphone system.

The Uphone has some advantages over a PDA device for transaction processing disclosed by Maes et al. in U.S. Pat. No. 6,016,476, in which a digital certificate is downloaded from a central server of a service provider. The digital certificate in the prior art accomplishes the goal of identification verification by checking whether the digital certificate is expired before providing any credit card information. As shown above, the Uphone system provides a digital signature which not only verifies the user identification but also the content of the transaction.

EXAMPLE 4

Reservation

When a person makes a reservation of a hotel room, a rent car or a ticket, he is asked to provide a credit card number over the phone. In the prior art, it is difficult to verify his identification. In the Uphone system, the true identification is given by his Uphone number. He can also sign the credit number and the merchant can verify the signature from the public key available from the database in a similar way as described in FIG. 10. When the reservation is made, the merchant can send the reservation in text form by the message-in-message method. The customer can then sign the reservation and send the signature to the merchant. Now the customer has a copy of the reservation in the Uphone for late reference. In practice, this signature of the reservation alone is enough for verification of both the identification and the content.

EXAMPLE 5

Multiple Communication Devices at Different Locations

As the Uphone system separates the user phone number (Uphone number) from the physical phone number, multiple communication devices at different locations can be bonded to a Uphone number. For example, a person can have the voice communication to his cellular phone, fax to his home fax machine, email to an internet host, and picture to a contract commercial photo developer.

This is especially convenient when certain communication media is expensive or seldom used so that it is cost effective to share the equipment. Commercial service can also be provided to customers. For example, family member may share a fax machine at home. In a student dormitory, a fax machine may be provided for use to the residents. The Uphone number can be conveniently used to locate the receiver. In the near future, more and more people will have a digital camera, but maybe not everyone can afford a photo printer. A commercial photo printer can be set up as the physical receiver of picture message related to the Uphone number. One can print out the photos for himself by calling his own Uphone number and then send out the digital images. One can also print out the photos for others by calling the corresponding Uphone numbers and then send out the digital images. The printed photos can then be delivered to the customer as the address is obtained from the Uphone database. The address information can be included in two ways in the Uphone system: (1) the address is a property of the Uphone number; and (2) physical delivery can be added as a message type and the address is a physical number. This is an expedite way to send out pictures to locations far away.

EXAMPLE 6

Coin-operated Machine

There are many coin-operated machines such as vending machine, washing machine, parking meters, and instant photo machines. One of the disadvantage of such machines is that people sometimes do not have enough coins with them. Another disadvantage with certain machines is that it may be cumbersome to modify the machine to accept more coins to adjust for inflation. It is also labor intensive to collect the coins.

The Uphone system provides a convenient way to set up a payment system without the mentioned disadvantages. An infrared transceiver device will be installed to replace the coin counter. A communication can be established between the Uphone and the infrared transceiver device. The customer sends out a request for service through the Uphone, the machine then provides a digital receipt, and the customer can sign the receipt and give the signature to the machine. The machine can then verify the signature either through a connected database or a local database. The customer can then be billed.

Alternatively, a cash account can be set up in the Uphone and the amount can be automatically deducted. In this case, the Uphone acts as a universal carrier of cash cards.

EXAMPLE 7

Multiple Users

In a family, the physical phones are usually shared by family members. In a university dormitory and some offices, the phones are often shared by the roommates. There is a need to know who is the receiver of an incoming call and who is the caller of an outgoing call. One method in the prior art is to assign several phone numbers to the same phone line and then provides a distinct ring for each phone number. For outgoing calls, a method in the prior art is ask the caller to input additional code number for clarification, say, 1 for the first user and 2 for the second user, etc. However, each phone number works only on one location.

The Uphone system provides a consistent way to identify the caller and receiver regardless of the location. The Uphone will automatically provide its identification when placing a call. The Uphone adaptor can automatically distribute the incoming phone to the intended receiver or deliver related signals such as a distinct ring, or distinct light, or sound of phone number, or a visual display of the phone number, at the choice of the user.

A special advantage for university dormitory or university is that students can keep the same Uphone number for the duration of his study. Normally in a university dormitory the physical phones have already been assigned telephone numbers and these numbers are normally not changed. Since students move frequently, their physical phone numbers will change accordingly. In the prior art, students have to inform his friends of such changes to keep in touch. In the Uphone system, the same Uphone number can be used regardless of the physical location.

EXAMPLE 8

Ticket

In the prior art, E-ticket is available as an alternative to the printed ticket, such as the flight ticket. Usually the customer is given an authorization number, and the authorization number is used along with a picture ID during the check-in process. The customer has to write down the authorization number and the schedule information.

In the Uphone system, the name of the customer and the flight schedule along with authorization information can be transmitted and stored in the Uphone of the customer. The authorization information can be a digital signature of the airline. During check-in, the ticket information can be conveniently transmitted through the infrared device into the computer of the check-in counter. This offers both accuracy and efficiency in the ticket booking and check-in process.

EXAMPLE 9

Toll Payment

For the toll way, the fee may be collected manually or a basket is provided to collect coins. An automatic method in the prior art is the smart card hanged on the rear-mirror hanger. The card is prepaid and proper charge will be applied when the car passes by the toll gate. As different toll system may use a different card system, this system requires pre-registration and it is not convenient for people out of town.

For a long distance toll way, a ticket is taken by the driver at the entry gate and the ticket is presented to the cashier at the exit gate to calculate the proper charge. This requires rolling down the window to get the ticket and pay the fee. This is neither convenient nor efficient.

The Uphone system offers an effective solution to the problem. A driver can use his Uphone and transmit the payment through the infrared transceiver. The infrared transceiver at the toll gate can collect the payment information. For long distance toll, the ticket information can be transmitted to the Uphone and stored in the Uphone for payment at exit. It is no longer necessary to roll down the window.

EXAMPLE 10

Security Entry

As the Uphone can uniquely related to a person, it can be used to control security entry into a home, an office, and other physical properties. One way to accomplish the security check function is to store the public keys of qualified people in the security control device, and a person's digital signature can be verified with the public key.

Additional secret code can be provided. For example, the content to be signed can be used as the secret code. Say, the Materials Science undergraduate students is given a secret code "Materials Wonder" to access the department computer room. Students then can sign "Materials Wonder" and give the signature to the security device through infrared transmission. The signature is verified with the public key.

Therefore, three levels of security check are provided by the Uphone system. First, at the administration level, an entry should be included for the Uphone number and related public key, which can be obtained from a database in the Uphone system. This limits the list of people for potential entrance. Second, the content to be signed can be changed at the administration level. This offers flexibility for the administrator to control the entrance for certain time period and certain location. This also prevents the use of a stolen Uphone. Third, an individual must have the Uphone with the proper private key and/or the content, and he must also know the PIN to activate the Uphone.

Figure 11:
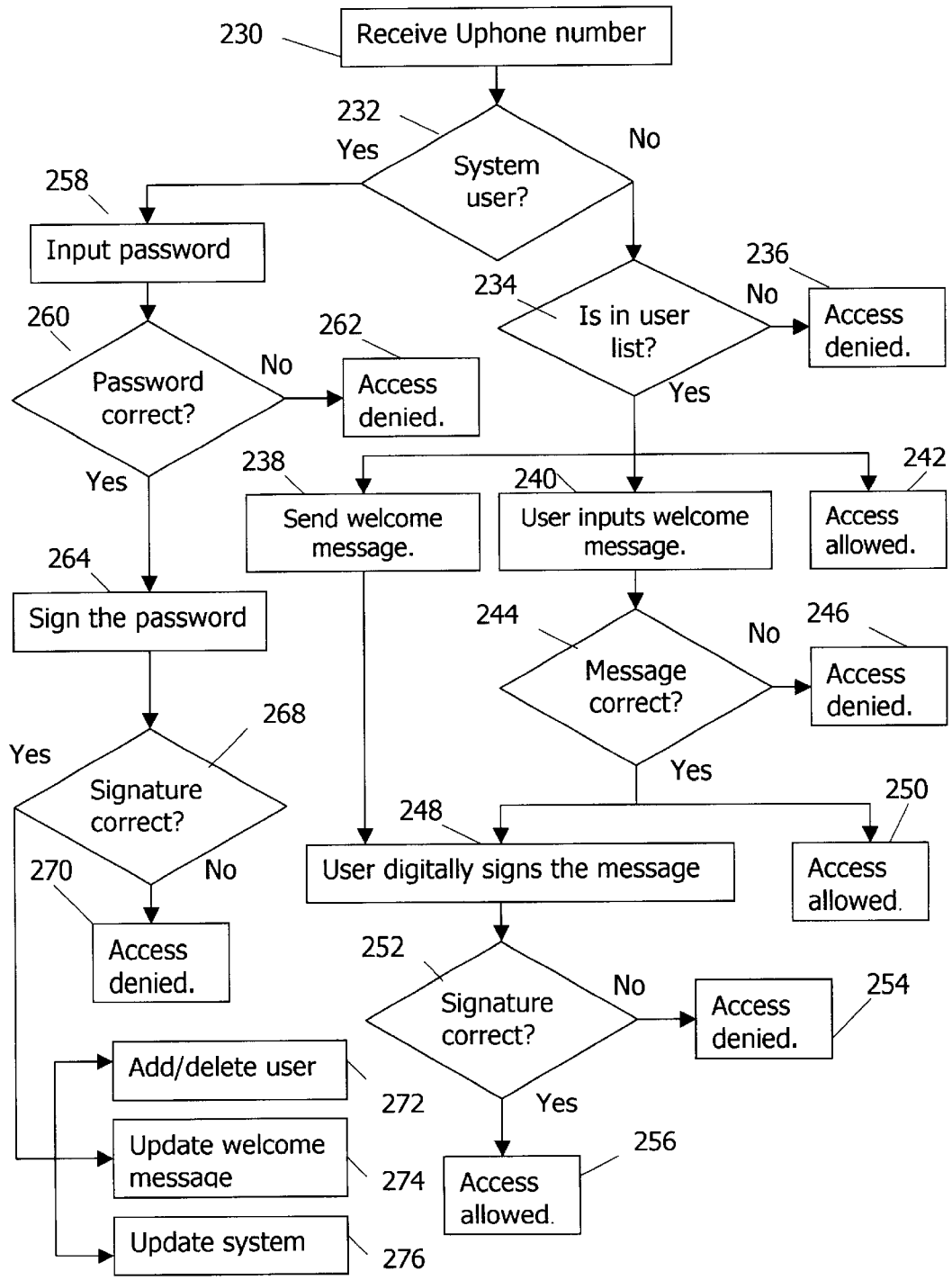
FIG. 11 is a flow chart illustrating the operation of a security entry using the Uphone system.

The operation is further illustrated by the flow chart in FIG. 11. After the establishment of IR communication with the security control device, the device receives 230 the Uphone number of the user. This is checked 232 to see whether the user is a system administrator. For ordinary users, the device checks 234 whether the user Uphone is in the user list. If not, access is denied 236. If yes, one of the three options can be given according to the system setup. For properties with the least security concerns, access is allowed 242 at this level. Or the device sends 238 a welcome message to the Uphone for a response of a digital signature 248. The third option is to ask the user to input 240 the welcome message. Normally the user has already downloaded or input the message in his Uphone and the action is just pushing a button or two to choose and send the message. This is like a password control. The message is checked 244 with the stored message. If the message is not correct, access will be denied 246. If the message is correct, the system administrator can set either access 250 at this level or digital signature verification 248. At block 248, the user digitally signs the message using the digital signature function of the Uphone (for example, the sign method in Sig.java) and then sends the signature to the device. The device verifies 252 the signature through the public key corresponding to the Uphone number by a signature verification program(for example, the verify method in Sig.java). If the result is false, access is denied 254, otherwise access is allowed 256.

For the system administrator, the strictest control described above is used. First, the system user is required to input 258 a password. The password is checked 260 and access is denied 262 is the password is wrong. If the password is correct, the system user proceeds to sign 264 the password and send the signature to the device. The device then checks 268 the validity of the signature. If the signature is not verified positively, access is denied 270. If the signature is valid, the system user gets the access and he can perform system administration functions. He can add/delete 272 users, change 274 the welcome message, and update 276 system settings.

This keyless security entry based on the Uphone system offers several advantages over prior art methods. For example, card or key based entry control can be compromised by a stolen or fabricated card or key. The same is true for the remote signal device for keyless entry. The system according to the present invention overcomes the above shortcomings. Another advantage is that guest entry can be enabled without the issuance of a key. The host, as an administrator or system user, can simply input the Uphone number and related public key of the guest, and optionally the secret code. This can be used for entry into a home, a office, a car, etc. This may be very useful for entry into hotel rooms and rental cars. Still another advantage is that identity verification by the digital signature can be dynamic by changing the content for the digital signature. This avoids the security concerns over stolen passwords and false identities, which is especially useful for e-commerce.

EXAMPLE 11

Universal Remote Controller of Appliances

The identification feature through the public key of the Uphone can also be used to control the operation of electric appliances. The access to an appliance can be accomplished by the infrared transceiver or through the telephone line connection. When an appliance is equipped with the capacity to accept a digital signature and perform verification of the digital signature, the identification of the user can be determined. Operation code can be stored in the Uphone. This can be used to control who can use the equipment and what operation can be performed by the user.

For example, a user list can be created for a TV set and for each user the allowable channels are selected. Therefore, kids can only watch channels allowable for them without further interference from the parents. Access to shared appliances can be set up in a similar way.

This can also be used to start or stop an operation of an appliance. For example, the Uphone can be used to control the temperature setting of the home. In the winter, the house temperature can be set at a lower value when nobody is at home. Before returning home from work, the user can make a call home to set the temperature back to the normal value. The temperature will be the normal value when the user is back at home. The temperature setting of the air conditioner can be controlled in a similar way.

EXAMPLE 12

Televoting

Televoting is a service offered by the intelligent network in the prior art, in which a vote can be cast by calling a predetermined number. One way is to provide a series of telephone numbers for the different choices. For example, 703-555-0001 for candidate A and 703-555-0002 for candidate B. Then the number of calls to the predetermined numbers can be counted as the voting result. Another way is to provide choices through an announcement after the phone is connected. For example, the announcement may be "You have reached the televoting service for this year's election, please press 1 for candidate A and 2 for candidate B." U.S. Pat. No. 5,970,385 by Pykalisto of Nokia disclosed an improvement in which a feedback is provided so that the caller is notified that his vote has been registered correctly.

A disadvantage of the prior art methods is that possible fraud may occur since a person can make multiple votes for a candidate. When only calls are counted, multiple votes can be placed from the same phone. When the voting service chooses to count only one vote from a single phone number, a person can make multiple votes from different telephones.

In the Uphone system, televoting can be conducted without the above mentioned shortcoming since a Uphone number is uniquely identified with an individual or an organization. Therefore, appropriate check can be easily performed to remove multiple votes from the same person. This operation can be done with information already stored in the central database of the Uphone system and it is completely transparent to the users.

Figures 12A, 12B, 12C, 12D, 12E:
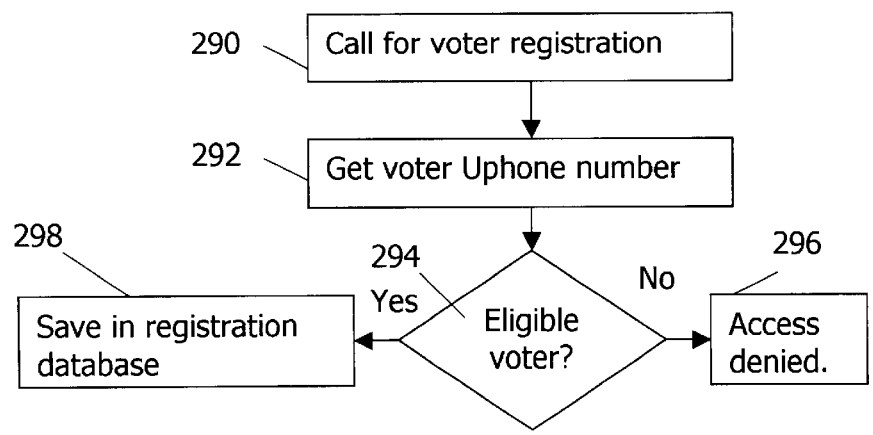
FIGS. 12A to 12F illustrate the operation of a televoting system using the Uphone system.
Figure 12F:
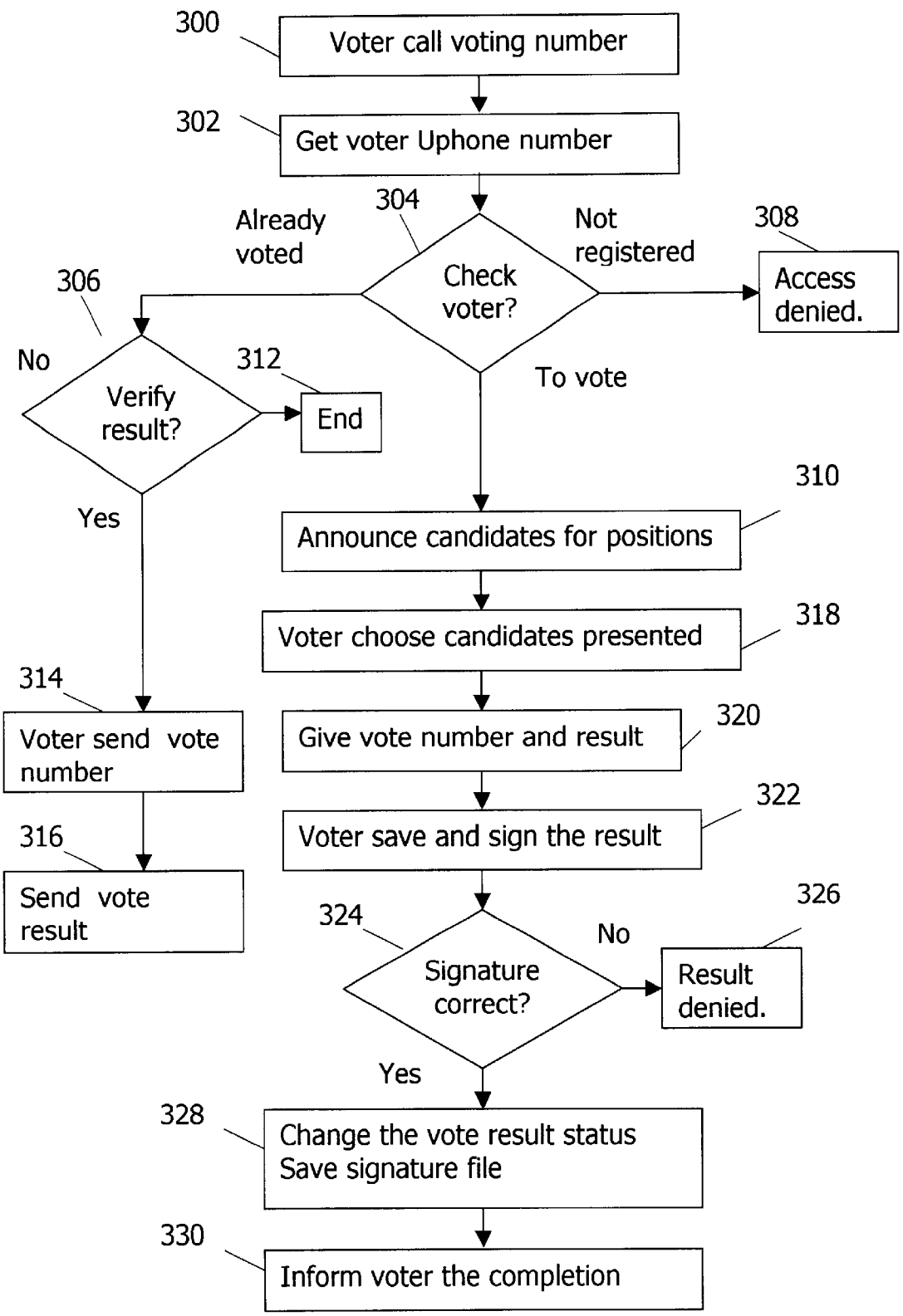

For more formal voting like the presidential election in a country, the following method is proposed and is explained in reference to FIGS. 12A to 12F. First, predetermined phone numbers for televoting registration and televoting are posted, say through newspaper and TV. Preferably the phone number are toll free phone numbers. The procedure for televoting is explained to the public through the mass media and/or mails delivered to voters. The televoting process consists of a voter registration step and a voting step. When a voter makes 290 a call for registration to the designated phone number from a Uphone, the televoting center gets 292 the Uphone number and makes 294 a background check to verify the eligibility of the caller against the Eligible voter list (FIG. 12A). If the caller is not on the list, access is denied 296 and an appropriate response is given, such as "Sorry, you are not a qualified voter, please contact 800-555-0000 for more information." If the caller is on the list, the Uphone number is saved 298 in the Televoting voter list (FIG. 12B). Behind the scene, the public key of the user is obtained from the Uphone database system and the status of the voter is set as "to vote" in the table of FIG. 12B. The name of the televoting voter will be deleted from lists of other forms of voting.

During the voting step (FIG. 12F), a voter makes 300 a call for voting to the designated phone number from a Uphone, the televoting center gets 302 the Uphone number and checks 304 the voting status of the caller against the Televoting voter list (FIG. 12B). If the caller is not on the list, access is denied 308 and an appropriate response is given, such as "Sorry, you are not a registered voter, please contact 800-555-0000 for more information." If the caller is on the list and the voting status is "to vote", the caller is a registered televoting voter ready for voting, and an appropriate response will be given accordingly, such as "Welcome to the 2000 XYZ city election televoting center. Please press the button corresponding to your candidate". For each position, the candidates are announced 310. For example, "For the Mayor of XYZ city, press 1 for John Doe, press 2 for Jane Smith, press 3 for William Smith, press 0 for none". The voter will choose 318 the candidate by pressing the corresponding button. The process continues until all the positions are cast, and the system will give 320 the voter the result for verification and the result is also saved in the Televoting result list (FIG. 12C). In step 318, the voter can also type in a series of numbers or names corresponding to the positions and send it to the televoting center directly. The televoting center then send 320 the result by a short text message to the Uphone, such as vote number 000000002: mayor, (02) Jane Smith. police chief, (04) Robert Smith. Then the voter can sign 322 the result and send the signature to the televoting center. The center can then perform 324 the signature verification to confirm the result and the identification of the voter. If the signature is not valid as verified by the public key, the result is denied 326 and an appropriate announcement is given to the voter. If the signature is valid, the status in FIG. 12C will be updated 328 to "signed"and the signature is saved in the Televoting signature list (FIG. 12D). The voter is notified 330 that the result has been saved. The result is FIG. 12C will be tallied to give the final result. To protect the confidentiality of the voting process, no record is kept of the relation between the Uphone number (voter) and the vote number. However, the voter can verify his vote later from his vote number.

In step 304, if the status of the voter is "voted"in FIG. 12B, a response will be given such as "Welcome to the 2000 XYZ city election televoting center. Our system indicates that you have already cast your vote. Please contact 800-555-0000 for more information."The voter is asked 306 whether he wants to verify his vote. If the answer is negative, the conversation is finished 312. Otherwise, the voter inputs 314 his vote number and the televoting center will provide 316 the voting result from FIG. 17C.

The televoting system according to the present invention is convenient, accurate, and cost effective. Accurate voting result will be provided almost immediately when the voting is finished. People use the televoting system do not need to leave the home or work place. It also avoids the confusion and inaccuracy of some punch card systems. Since the system uses the telephone network, the same system can be used by different cities and towns for various elections. Therefore, no additional equipment purchase or personnel training is required for these organizations, which leads to significant reduction in voting cost.

EXAMPLE 13

Universal Signature

The signature function of the Uphone can be used as a universal signature because of the easy access to the public key from the telephone network. For example, signature of the customer is often required for parcel delivery service such as Postal Service, United Parcel Service, and Federal Express. In the prior art, handwritten signature is used. It is difficult for the delivery person to verify the signature. When the parcel is taken by someone else, it is often difficult to verify whether the parcel was delivered to the correct receiver from the signature. With the Uphone system, the receipt can be transmitted to the Uphone of the receiver, the receiver can then sign the receipt and give the signature to the delivery person. The signature will not only verify the identification of the receiver but also the goods delivered.

EXAMPLE 4

Music, Video, Ebook, and Software Delivery

The internet has made it possible to download music, ebook, and video programs easily. Then the music or video files can be played back. The ebook can be read in a browser like an ordinary book. However, as the files can be easily copied and redistributed, it is difficult to charge the user for the use of the music and video.

With the Uphone system, the public key of the purchaser can be embedded in the music file or video file. Every time the file is accessed, the verification of the user can be performed. Therefore, although the file can be copied like an ordinary file to any storage media like a hard disk, a floppy disk, a CD, a VCD, or a Zip drive, only the owner of the file can use it. Multiple public keys can also be incorporated in a similar way for files to be shared by a group of people such as a family.

One way to implement this scheme is to insert the verification process at the beginning of the file. A message is prompted to the user to sign a predetermined text, which would be different every time the file is accessed. Then the text can be passed to the Uphone from the computer through a communication connection such as an infrared transceiver. The user can use his Uphone to sign the text and pass the signature to the computer. Then the signature is verified with the public key embedded in the file. If the verification is successful, the playback can be continued. Otherwise, the user is notified that the user verification failed.

The verification can take place at the beginning or in the middle of the file or both. For example, some advertisements may be placed at the beginning of the file for free distribution while the user is prompted to give the signature. In addition, multiple users can also be granted by adding multiple public keys.

An alternative to the public key embedding is simply identify the Uphone number of the user since the corresponding public key can be obtained from the database. The function of matching Uphone number with the corresponding public key can be incorporated into the playback program.

The above user authentication scheme can be also used for the distribution of software so that only the legitimate purchaser can use the software. For example, the public key verification procedure can be incorporated into the installation program so that only the purchaser can install the software. More strictly, the verification procedure will be conducted every time the software is used.

Alternatively, the specific public key or public keys can be specified in a registration process. Therefore, the software can be freely copied, but the activation requires a registration process to establish the user authentication.

The above examples illustrate the versatile applications of the universal communication system. The system will bring benefits to all sectors of the communication industry including telecommunication, broadcasting, video, music, publishing, computer, financial transaction, and physical delivery. Service providers can design new services based on the common interface of the universal communication system.

Other embodiments of the invention will be apparent to those skilled in the art from a consideration of this specification or practice of the invention disclosed herein. It is intended that the specification and examples shall be interpreted as illustrative and not in a limiting sense, with the true scope and spirit of the invention being indicated by the following claims.

Computer Program Listings:

Computer program listing 1: Uphone.java

/* Program to illustrate the registration of a uphone number. */import javax.swing.*; import javax.swing.SwingConstants.*; import javax.swing.event.*; import java.awt.*; import java.awt.event.*; import java.util.*; import java.io.*; public class Uphone implements ActionListener { JPanel mainPanel; String uphoneNumber, userPIN, userLastName, userMidName, userFirstName; String userAddress, userCity, userState, userZIP; JButton registerButton; JLabel uphoneNumberLabel, userPINLabel, userLastNameLabel, userMidNameLabel, userFirstNameLabel; JLabel userAddressLabel, userCityLabel, userStateLabel, userZIPLabel; JLabel errorLabel; JTextField uphoneNumberText, userPINText, userLastNameText, userMidNameText, userFirstNameText; JTextField userAddressText, userCityText, userStateText, userZIPText; JTextField errorText; Uphone() { /*create graphic user interface.*/ mainPanel =new JPanel(); registerButton =new JButton ("Register"); registerButton.setEnabled(true); registerButton.setMnemonic(KeyEvent.VK_R); registerButton.setActionCommand("register"); registerButton.addActionListener(this); registerButton.setToolTipText("Click this button to start registration."); uphoneNumberLabel =new JLabel("Uphone number: ", SwingConstants.RIGHT); userPINLabel =new JLabel("PIN: ", SwingConstants.RIGHT); userLastNameLabel =new JLabel("Last Name: ", SwingConstants.RIGHT); userMidNameLabel =new JLabel ("Middle Name: ", SwingConstants.RIGHT); userFirstNameLabel =new JLabel("First Name: ", SwingConstants.RIGHT); userAddressLabel =new JLabel ("Address: ", SwingConstants.RIGHT); userCityLabel =new JLabel("City: ", SwingConstants.RIGHT); userStateLabel =new JLabel("State: ", SwingConstants.RIGHT); userZIPLabel =new JLabel("ZIP: ", SwingConstants.RIGHT); errorLabel =new JLabel ("Program status: ", SwingConstants.RIGHT); uphoneNumberText =new JTextField(10); userPINText =new JTextField (4); userLastNameText =new JTextField(10); userMidNameText =new JTextField(2); userFirstNameText =new JTextField(10); userAddressText =new JTextField (20); userCityText =new JTextField(20); userStateText =new JTextField(10); userZIPText =new JTextField(10); errorText =new JTextField(40); Grid BagLayout gridBag =new GridBagLayout(); Grid BagConstraints c =new GridBagConstraints(); mainPanel.setLayout(gridBag); c.fill =GridBagConstraints.BOTH; c.weightx =0.0; gridBag.setConstraints(uphoneNumberLabel, c); mainPanel.add(uphoneNumberLabel); c.weightx =1.0; gridBag.setConstraints(uphoneNumberText, c); mainPanel.add(uphoneNumberText); c.weightx =3.0; gridBag.setConstraints(userPINLabel, c); mainPanel.add (userPINLabel); c.weightx =1.0; c.gridwidth =GridBagConstraints.REMAINDER; gridBag.setConstraints(userPINText, c); mainPanel.add (userPINText); c.weightx =0.0; c.gridwidth =1; gridBag.setConstraints(userLastNameLabel, c); mainPanel.add(userLastNameLabel); c.weightx =2.0; gridBag.setConstraints(userLastNameText, c); mainPanel.add(userLastNameText); c.weightx =0.0; gridBag.setConstraints(userMidNameLabel, c); mainPanel.add(userMidNameLabel); c.weightx =1.0; gridBag.setConstraints(userMidNameText, c); mainPanel.add(userMidNameText); c.weightx =0.0; gridBag.setConstraints(userFirstNameLabel, c); mainPanel.add(userFirstNameLabel); c.weightx =2.0; c.gridwidth =GridBagConstraints.REMAINDER; gridBag.setConstraints(userFirstNameText, c); mainPanel.add(userFirstNameText); c.weightx =0.0; c.gridwidth =1; gridBag.setConstraints(userAddressLabel, c); mainPanel.add(userAddressLabel); c.weightx =1.0; c.gridwidth =GridBagConstraints.REMAINDER; gridBag.setConstraints(userAddressText, c); mainPanel.add (userAddressText); c.weightx =0.0; c.gridwidth =1;

gridBag.setConstraints(userCityLabel, c); mainPanel.add (userCityLabel); c.weightx =1.0; c.gridwidth =GridBagConstraints.REMAINDER; gridBag.setConstraints(userCityText, c); mainPanel.add (userCityText); c.weightx =0.0; c.gridwidth =1; gridBag.setConstraints(userStateLabel, c); mainPanel.add (userStateLabel); c.weightx =2.0; gridBag.setconstraints (userStateText, c); mainPanel.add(userStateText); c.weightx =3.0; gridBag.setConstraints(userZIPLabel, c); mainPanel.add(userZIPLabel); c.weightx =1.0; c.gridwidth =GridBagConstraints.REMAINDER; gridBag.setConstraints(userZIPText, c); mainPanel.add (userZIPText); c.weightx =0.0; c.fill =GridBagConstraints.NONE; gridBag.setConstraints (registerButton, c); mainPanel.add(registerButton); c.fill =GridBagConstraints.BOTH; c.weightx =0.0; c.gridwidth =1; gridBag.setConstraints(errorLabel, c); mainPanel.add (errorLabel); c.weightx =1.0; c.gridwidth =GridBagConstraints.REMAINDER; gridBag.setConstraints(errorText, c); mainPanel.add (errorText); } public void actionPerformed(ActionEvent e) { if (e.getActionCommand().equals("register")) { Thread registerThread =new Register("registerThread"); registerThread.start(); } } class Register extends Thread { /*A thread to perform the registration process.*/ public Register (String str) { super(str); } public void run ( ) { registerButton.setEnabled(false); errorText.setText ("registering . . . "); uphoneNumber =uphoneNumberText.getText(); userPIN =userPINText.getText(); userLastName =userLastName meText.getText(); userMidName =userMidNameText.getText(); userFirstNa me =userFirstNameText.getText(); userAddress =userAddressText.getText(); userCity =userCityText.getText(); userState =userStateText.getText (); userZIP =userZIPText.getText(); try { /*verification.*/ Verification verification =new Verification(uphoneNumber, userPIN); verification.create(); /*key generation. */ Keys keys =new Keys(uphoneNumber); keys.create(); /*save address. */ Address address =new Address(uphoneNumber, userLastName, userMidName, userFirstName, userAddress, userCity, userState, userZIP); address.create(); registerButton.setEnabled(true); errorText.setText ("Registration completed successfully. "); } catch (Exception error) { errorText.setText("Error: "+error.getMessage()); registerButton.setEnabled(true); } } } public static void main(String[] args) { Uphone uphone =new Uphoneo; /*Create a new window. */ J]Frame f =new JFrame("Universal Communication System"); f.addWindowListener(new WindowAdaptero { public void windowClosing(WindowEvent e) { System.exit(0); } }); f.setContentPane(uphone.mainPanel); f.packo; f.setVisible (true); } }

Computer program listing 2: Address.java

/* Create and save an address file. */ import java.io.*; class Address { String uphoneNumber, userLastName, userMidName, userFirstName; String userAddress, userCity, userState, userZIP; Address (String uphoneNumber, String In, String mn, String fn, String add, String city, String state, String zip) { this.uphoneNumber =uphoneNumber; userLastName =In; userMidName =mn; userFirstName =fn; userAddress =add; userCity =city; userState =state; userZIP =zip; } Address (String uphoneNumber) { this.uphoneNumber =uphoneNumber; try { FileReader fileReader =new FileReader(uphoneNumber+ ".add"); BufferedReader bufferedReader =new BufferedReader(fileReader); userLastName =bufferedReader.readLine(); userMidName =bufferedReader.readLine(); userFirstName =bufferedReader.readLine(); userAddress =bufferedReader.readLine(); userCity =bufferedReader.readLine(); userstate =bufferedReader.readLine(); userZIP =bufferedReader.readLine(); bufferedReader.close(); } catch (IOException ioe){} } /*save the address.*/ void create( throws IOException { FileWriter filewriter =new FileWriter (uphoneNumber+".add"); fileWriter.write(userLastName+ "n"); fileWriter.write(userMidName+"n"); fileWriter.write (userFirstName+"n"); fileWriter.write(userAddress+"n"); fileWriter.write(userCity+"n"); fileWriter.write(userState+ "n"); fileWriter.write(userZIP+"n"); filewriter.close(); }}

Computer program listing 3: Keys.java

/* Generate a pair of private key and public key for digital signature. */import java.io.*; import java.security.*; class Keys { String uphoneNumber; Keys (String number){ uphoneNumber =number; } /* Generate a key pair. */ void create( { try { KeyPairGenerator keyGen =KeyPairGenerator.getInstance("DSA", "SUN"); SecureRandom random =SecureRandom.getInstance ("SHAlPRNG", "SUN"); keyGen.initialize(1024, random); KeyPair pair =keyGen.generateKeyPair(); PrivateKey privateKey =pair.getprivateo; PublicKey publicKey =pair.getPublic(); byte[] key =publicKey.getEncodedo; FileOutputStream output =new FileOutputStream (uphoneNumber+".pub"); output.write(key); output.close(); key =privateKey.getEncoded(); output =new FileOutputStream(uphoneNumber+".pri"); output.write (key); output.close(); } catch (Exception e) { System.err.println("Caught exception "+e.toString()); } } public static void main (String args []) { Keys keys =new Keys (args[0]); keys.create(); }}

Computer program listing 4: Verificationjava

/* Provide a dynamic PIN. */ import java.io.*; import java.util.*; import java.text.*; class Verification { String uphoneNumber, userPIN, PINDyn; Verification (String uphoneNumber, String userPIN) { this.uphoneNumber =uphoneNumber; this.userPIN =userPIN; } Verification (String uphoneNumber) { this.uphoneNumber =uphoneNumber; try { FileReader fileReader =new FileReader(uphoneNumber+".pin"); BufferedReader bufferedReader =new BufferedReader(fileReader); userPIN =bufferedReader.readLine(); bufferedReader.close(); } catch (IOException ioe){} } /*save the userPIN in a file.*/ uphoneNumber.pin void create( throws IOException { FileWriter filewriter =new FileWriter(uphoneNumber+".pin"); fileWriter.write(userPIN+"n"); filewriter.close(); } /*Generate a dynamic PIN.*/ String getPINDyno { Date date =new Dateo; long time =date.getTime()/60000; /*reduce the sensitivity to 1 minute.*/ long id =Long.parseLong(uphoneNumber); int pinfix =Integer.parseInt(userPIN); long PIN =((time+id)>>>16)* ((id+time+pinfix)%12345); /*substitute algorithm here.*/ DecimalFormat format =new DecimalFormat("0000"); format.setMaximumIntegerDigits(4); PINDyn =format.format(PIN); return PINDyn; } /* get the fixed PIN. */ String getPINFix() { return userPIN; } public static void main(String args []) { Verification idpin =new Verification (args[0], args[1]); System.out.println(idpin.getPINDyno); System.out. pri ntln(idpin .getPINFixo); }}

Computer program listing 5: Sig.java

/* Digital signature of a document and its verification. */ import java.io.*; import java.security.*; import java.security.spec.*; class Sig { String uphoneNumber, fileName; Sig (String uphoneNumber){ this.uphoneNumber =uphoneNumber; } void sign (String documentName) { try { /* import the encoded private key. */ FileInputStream keyfis =new FileInputStream(uphoneNumber+".pri"); byte[] encodedKey =new byte[keyfis.available()]; keyfis.read(encodedKey); keyfis.close(); PKCS8EncodedKeySpec priKeySpec =new PKCS8EncodedKeySpec(encodedKey); KeyFactory keyFactory =KeyFactory.getInstance("DSA", "SUN"); PrivateKey privateKey =keyFactory.generatePrivate (priKeySpec); /*Create a signature object. */ Signature dsa =Signature.getInstance("SHAlwithDSA", "SUN"); dsa.initSign(privateKey); /*input the file to be signed.*/ FileInputStream docfis =new FileInputStream (documentName); BufferedInputStream bufin =new BufferedInputStream(docfis); byte[] buffer =new byte [1024]; int len; while (bufin.availableo !=0) { len =bufin.read(buffer); dsa.update(buffer, 0, len); }; bufin.close(); /*sign the document and save the document signature.*/ byte[] docsignature =dsa.signo; FileOutputStream sigfos =new FileOutputStrea m(documentName+ ".sig"); sigfos.write(docSig nature); sigfos.close(); } catch (Exception e) { System.err.println("Exception: "+e.toString (); } } boolean verify (String documentName) { boolean result =false; try { /* import the encoded public key.*/ FileInputStream keyfis =new FileInputStream (uphoneNumber+".pub"); byte[] encodedKey =new byte [keyfis.available()]; keyfis.read(encodedKey); keyfis.close(); X509EncodedKeySpec pubKeySpec =new X509EncodedKeySpec(encodedKey); KeyFactory keyFactory =KeyFactory.getInstance("DSA", "SUN"); PublicKey publicKey =keyFactory.generatePublic(pubKeySpec); /* input the signature bytes.*/ FileInputStream sigfis =new FileInputStream(documentName+".sig"); byte[] docsignature =new byte[sigfis.available()]; sigfis.read(docSignature); sigfis.close(); /* create a signature object.*/ Signature dsa =Signature.getInstance("SHAlwithDSA", "SUN"); dsa.initVerify(publicKey); /*input the file to be verified. */ FileInputStream docfis =new FileInputStream (documentName); BufferedInputStream bufin =new BufferedInputStream(docfis); byte[] buffer =new byte [1024]; int len; while (bufin.availableo !=0) { len =bufin.read(buffer); dsa.update(buffer, 0, len); }; bufin.close(); /*verify the signature.*/ result =dsa.verify (docSignature); } catch (Exception e) { System.err.println ("Exception: "+e.toString()); } return result; } public static void main(String[] args) { if (args.length !=3) { System.out.println("Help:Sig sign/verify uphoneNumber documentName."); } else if (args[0].equals("sign")) { Sig sig =new Sig(args[1]); sig.sign(args[2]); } else if (args[0] .equals("verify")) { Sig sig =new Sig(args[1]); boolean result =sig.verify(args[2]); System.out.println("signature verification result: "+result); } else { System.out.println ("Please verify usage: Sig sign/verify uphoneNumber documentName."); } }}

I claim:

1. A method of universal communication, comprising:
   (a) assigning a plurality of user phone numbers each representing a user in a communication system;
   (b) establishing user verification and user digital signature service of a private key—public key pair algorithm in a database system;
   (c) providing a handheld personal communication device for user verification and user digital signature to each user, which will store data and programs for performing user verification and for performing digital signature by said private key—public key pair algorithm. and provide input and output means for user verification and user digital signature;
   (d) establishing binding relation between the user phone number and the physical phone number of a communication device in said database system;
      whereby a people oriented communication system is established to replace the location oriented communication system;
      whereby a common interface is established for various physical communication systems which makes possible the cooperation and independent development of said physical communication systems;
      whereby a general user identification and signature service is provided.

2. The method of universal communication according to claim 1, wherein said user phone number adopts the existing numbering system of telephone communication.

3. The method of universal communication according to claim 1, wherein said user verification uses an algorithm which takes the user phone number, user PINT, and time as input parameters to generate a dynamic PIN and which is of sufficient complexity so that it is difficult to reverse engineer said algorithm.

4. The method of universal communication according to claim 1, wherein said database system is organized in a distributed computing system.

5. The distributed computing system in claim 4, wherein the architecture of said distributed computing system is selected from the group consisting of enterprise javabeans and COM+.

6. The method of universal communication according to claim 1, further comprising a dialing scheme including the user phone number of the receiver, the user phone number and verification of the sender, and the message type.

7. The method of universal communication according to claim 1, further comprising a physical dialing method, whereby an alternative communication method is provided when the intention is to reach a particular physical location.

8. The method of universal communication according to claim 1, further comprising a message in message communication mode in which the communication parameters in the first message is used to make communication in the second message type.

9. The method of universal communication according to claim 1, further comprising providing an adaptor which will detect control signals, switch and connect communication devices.

10. The method of universal communication according to claim 1, further comprising
    (a) storing the public keys of a plurality of user phone numbers obtained from said database in a control device of a property;
    (b) providing a message for a user to digitally sign said message with the handheld personal communication device;
    (c) verifying the digital signature provided by said user with said public key in step (a) for identification and authorization verification; whereby a security access to physical properties and software is provided.

11. The method of universal communication according to claim 1, further comprising
    (a) transforming information in a first message type into information in a second message type;
    (b) obtaining the physical phone number corresponding to said second message type and the receiver of said first message type;

(c) sending the information in said second message type to said physical phone number obtained in (b); whereby different communication methods can work together to provide a service.

12. The method of universal communication according to claim 1, further comprising
   (a) establishing a communication link with a merchant using the handheld personal communication device;
   (b) sending payment information from said handheld personal communication device to said merchant;
   (c) receiving transaction information from said merchant;
   (d) producing a digital signature of said transaction information by the digital signature function of said handheld personal communication device and sending said digital signature to said merchant;
   (e) verifying said digital signature with a public key obtained from the database system; whereby a convenient, secure and cost-effective electronic transaction system is provided.

13. The method of universal communication according to claim 1, further comprising
   (a) providing at least one access number for voter registration and voting;
   (b) registering voters by obtaining the user phone number of a caller and comparing said user phone numbers with a eligible voter list;
   (c) obtaining the vote result from a voter and assigning a vote number for said vote result;
   (d) obtaining a digital signature for said vote result provided by the handheld personal communication device of said voter and verifying the validity of said digital signature with the public key of said voter;
   (e) saving said vote result and said digital signature along with said vote number;
   (f) tallying the vote results; whereby an accurate, convenient, and cost-effective voting method is provided.

14. A handheld personal communication device used as a controller in a communication system, comprising:
   (a) a CPU for processing data and a read-only memory coupled with said CPU for storing data and programs for user verification and user digital signature;
   (b) a random access memory for storage of data;
   (c) a display device for presenting information;
   (d) a phone device for sending and receiving information, and for providing input through the keyboard of said phone device;
   (e) a short-distance wireless communication device for sending and receiving information;
   (f) a data connection means for connecting said CPU with said memory, said display device, said phone device, and said short-distance wireless communication device;
   (g) programming means, executable bv said CPU, for performing user verification and performing user digital signature by a private key—public key pair algorithm; whereby said handheld personal communication device can be used for user identification and digital signature; whereby said handheld personal communication device can be used as a controller in a people oriented communication system.

15. The handheld personal communication device according to claim 14, wherein said display device is a LCD device.

16. The handheld personal communication device according to claim 14, wherein said short-distance communication device is an infrared device.

17. The handheld personal communication device according to claim 14, further comprising a radio frequency module which is connected to said phone device and is selected from the group consisting of cellular phone module and cordless phone module.

18. The handheld personal communication device according to claim 14, further comprising a personal digital assistant module connected to said CPU for enhanced data storage, data processing and presentation.

19. An adaptor in a communication system, comprising:
   (a) a CPU for processing data and a nonvolatile memory coupled with said CPU for storing data and programs;
   (b) a memory connected to said CPU for storage of the incoming call processing list, outgoing call processing list, and call notification list;
   (c) a means for detecting control signals and determining the call characteristics;
   (d) at least one input means for connecting to the outside line and at least one output means for connecting to communication devices;
   (e) a switch controlled by said CPU for connecting said input means and said output means;
   (f) programming means, executable by said CPU, for processing the incoming calls according to the incoming call processing list and call notification list,
   (g) programming means. executable by said CPU, for processing the outgoing calls according to the outgoing call processing list:
      whereby the adaptor will deliver the incoming communication media to the intended user and physical devices;
      whereby the physical devices at the user premises can work together.

20. A handheld personal communication device used as a controller in a communication system, comprising:
   (a) a CPU for processing data and a memory means coupled with said CPU for storing data and programs for user verification and user digital signature;
   (b) an input/output means for sending and receiving information;
   (c) a data connection means for connecting said CPU with said input/output means;
   (d) programming means, executable by said CPU, for performing user verification and performing user digital signature bv a private key—public key pair algorithm;
      whereby said handheld personal communication device can be used for user identification and digital signature;
      whereby said handheld personal communication device can be used as a controller in a people oriented communication system.

* * * * *